United States Patent
Yao et al.

(10) Patent No.: US 11,733,552 B2
(45) Date of Patent: Aug. 22, 2023

(54) ULTRA-FAST OPTICAL MODULATION AND ULTRA-SHORT PULSE GENERATION BASED ON TUNABLE GRAPHENE-PLASMONIC HYBRID METASURFACES

(71) Applicant: Arizona Board of Regents on behalf of Arizona State University, Scottsdale, AZ (US)

(72) Inventors: Yu Yao, Chandler, AZ (US); Ali Basiri, Diamond Bar, CA (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 145 days.

(21) Appl. No.: 17/219,607

(22) Filed: Mar. 31, 2021

(65) Prior Publication Data
US 2021/0302763 A1    Sep. 30, 2021

Related U.S. Application Data

(60) Provisional application No. 63/002,939, filed on Mar. 31, 2020.

(51) Int. Cl.
*G02F 1/01* (2006.01)

(52) U.S. Cl.
CPC ........ *G02F 1/0147* (2013.01); *G02F 2202/30* (2013.01); *G02F 2203/10* (2013.01); *G02F 2203/11* (2013.01)

(58) Field of Classification Search
CPC ............. G02F 2203/11; G02F 2203/10; G02F 2202/30; G02F 1/0147
See application file for complete search history.

(56) References Cited

U.S. PATENT DOCUMENTS 8,835,831 B2    9/2014    Yu et al.
8,835,905 B2    9/2014    Wober et al.
(Continued)

OTHER PUBLICATIONS

"Ultrafast Mid-Infrared Optical Modulator Based on Optically Controlled Graphene-Integrated Metasurface, 2020 Optica Publishing Group" (Year: 2020).*

(Continued)

*Primary Examiner* — Christopher Stanford
*Assistant Examiner* — Journey F Sumlar
(74) *Attorney, Agent, or Firm* — MH2 Technology Law Group LLP

(57) ABSTRACT

An optical device is disclosed. The optical device includes a silicon substrate, an aluminum oxide layer, an aluminum layer between the silicon substrate and the aluminum oxide layer, and a metasurface nanostructure. The metasurface nanostructure may include a graphene monolayer on the aluminum oxide layer and an electrically conductive nanoantenna array in direct contact with the graphene monolayer, where each nanoantenna in the nanoantenna array may include multiple segments, each segment having one or more parameters selected to achieve simultaneous resonance in the mid-infrared and the near infrared spectral regions when the graphene monolayer is irradiated with a near infrared pump pulse and a continuous mid-infrared probe. The optical device generates mid-infrared pulses via ultrafast modulation of hot carriers in the monolayer graphene.

19 Claims, 30 Drawing Sheets

(56) References Cited

U.S. PATENT DOCUMENTS

| | | | |
|---|---|---|---|
| 2011/0285942 | A1 | 11/2011 | Guo et al. |
| 2011/0309237 | A1 | 12/2011 | Seo et al. |
| 2014/0346357 | A1 | 11/2014 | Jarrahi et al. |
| 2017/0301819 | A1* | 10/2017 | Yao .................. H01L 31/028 |
| 2018/0309949 | A1 | 10/2018 | Fossum et al. |
| 2018/0364525 | A1 | 12/2018 | Murata et al. |

OTHER PUBLICATIONS

Bao, Q. & Loh, K. P., "Graphene Photonics, Plasmonics, and Broadband Optoelectronic Devices," ACS Nano 6, 3677-3694, (2012).
Kuramochi, H. et al., "Probing the early stages of photoreception in photoactive yellow protein with ultrafast time-domain Raman spectroscopy," Nature Chemistry 9, 660-666, (2017).
He, F. et al., "Femtosecond laser fabrication of monolithically integrated microfluidic sensors in glass," Sensors 14, 19402-19440 (2014).
Brunner, D. et al., "Parallel photonic information processing at gigabyte per second data rates using transient states," Nature Communications 4, 1364, (2013).
Sun et al., "Optical modulators with 2D layered materials," Nature Photonics 10, 227-238, (2016).
Chen J.-H. et al., "An all-optical modulator based on a stereo graphene-microfiber structure," Light: Science & Applications 4, (2015).
Guo, Q. et al., "Universal Near-Infrared and Mid-Infrared Optical Modulation for Ultrafast Pulse Generation Enabled by Colloidal Plasmonic Semiconductor Nanocrystals," ACS Nano 10, 9463-9469, (2016).
Ding, L. et al., "All-Optical Modulation in Chains of Silicon Nanoantennas," ACS Photonics 7, 1001-1008, (2020).
Afinogenov et al., "Ultrafast All-Optical Light Control with Tamm Plasmons in Photonic Nanostructures," ACS Photonics 6, 844-850, (2019).
Shen, L. et al., "Two-photon absorption and all-optical modulation in germanium-on-silicon waveguides for the mid-infrared," Opt. Lett. 40, 2213-2216, (2015).
Wu, R. et al, "All-Optical Modulation and Ultrafast Switching in MWIR with Sub-Wavelength Structured Silicon," Applied Sciences 9, 1808 (2019).
Yu, J.-P. et al., "Accelerating terahertz all-optical modulation by hot carriers effects of silver nanorods in PVA film," AIP Advances 9, 075017, (2019).
Reed, G. T. et al., "Silicon optical modulatorsm" Nature Photonics 4, 518-526, (2010).
Schönenberger, S. et al., "Ultrafast all-optical modulator with femtojoule absorbed switching energy in silicon-on-insulator," Opt. Express 18, 22485-22496, (2010).
Manolatou, C. et al., "All-optical silicon modulators based on carrier injection by two-photon absorption," Journal of Lightwave Technology 24, 1433-1439, (2006).
Almeida, V. R. et al., "All-optical control of light on a silicon chip," Nature 431, 1081-1084, (2004).
Liu, A. et al., "High-speed optical modulation based on carrier depletion in a silicon waveguide," Opt. Express 15, 660-668 (2007).
Xu, Q. et al., "12.5 Gbit/s carrier-injection-based silicon micro-ring silicon modulators," Opt. Express 15, 430-436, (2007).
Feng, D. et al., "High speed GeSi electro-absorption modulator at 1550 nm wavelength on SOI waveguide," Opt. Express 20, 22224-22232 (2012).
Watts, M. R. et al., "Ultralow power silicon microdisk modulators and switches," 2008 5th IEEE international conference on group IV photonics. 4-6 (IEEE).
Baba, T. et al. "Slow-light Mach-Zehnder modulators based on Si photonic crystals," Science and technology of advanced materials 15, 024602 (2014).
Li, W. et al. "Ultrafast All-Optical Graphene Modulator," Nano Letters 14, 955-959, (2014).
Sun, F. et al., "The all-optical modulator in dielectric-loaded waveguide with graphene-silicon heterojunction structure,". Nanotechnology 29, 135201, (2018).
Dash, A. et al., "Enhanced all-optical cavity-tuning using graphene," Opt. Express 27, 34093-34102, (2019).
Sun, F. et al., "An all-optical modulator based on a graphene-plasmonic slot waveguide at 1550 nm," Applied Physics Express 12, 042009, (2019).
Wen, Q.-Y. et al., "Graphene based All-Optical Spatial Terahertz Modulator," Scientific Reports 4, 7409, (2014).
Tasolamprou, A. C. et al., "Experimental Demonstration of Ultrafast THz Modulation in a Graphene-Based Thin Film Absorber through Negative Photoinduced Conductivity," ACS Photonics 6, 720-727, (2019).
Yao, Y. et al., "Wide Wavelength Tuning of Optical Antennas on Graphene with Nanosecond Response Time," Nano Letters 14, 214-219, (2014).
Yao, Y. et al., "Electrically Tunable Metasurface Perfect Absorbers for Ultrathin Mid-Infrared Optical Modulators," Nano Letters 14, 6526-6532, (2014).
Ulstrup, S. et al., "Ultrafast electron dynamics in epitaxial graphene investigated with time—and angle—resolved photoemission spectroscopy," Journal of Physics: Condensed Matter 27, 164206 (2015).
Gierz, I. et al., "Snapshots of non-equilibrium Dirac carrier distributions in graphene," Nature materials 12, 1119-1124 (2013).
Lui, C. H. et al., "Ultrafast Photoluminescence from Graphene," Physical Review Letters 105, 127404, (2010).
Behadur, Birendra. "Liquid Crystal Displays," Molecular Crystals and Liquid Crystals, 1984, 109 (1), pp. 3-93.
Stephens, Philip J. "Vibrational Circular Dichroism Spectroscopy: A New Tool for the Stereochemical Characterization of Chiral Molecules," ChemInform, 2004, 35 (27), pp. 699-725.
Yang et al. "Vibrational Circular Dichroism Spectroscopy of Chiral Molecules," Top Curr Chem, 2011, 298, pp. 189-236.
Yu, N. et al., Flat optics with designer metasurfaces. Nature Materials 2014, 13, 139.
Zhao, X. et al., Circle polarization shift keying with direct detection for free-space optical communication. Journal of Optical Communications and Networking 2009, 1 (4), 307-312.
Zhao, Y. et al., Chirality detection of enantiomers using twisted optical metamaterials. Nature Communications 2017, 8, 14180.
Zhao, Y. et al., Twisted optical metamaterials for planarized ultrathin broadband circular polarizers. Nature Communications 2012, 3, 870.
Zheng, G. et al., Metasurface holograms reaching 80% efficiency. Nature Nanotechnology 2015, 10, 308.
Flueraru et al. "Error Analysis of a Rotating Quarter-Wave Plate Stokes' Polarimeter," IEEE Transactions on Instrumentation and Measurement, vol. 57, No. 4, Apr. 2008, 5 pages.
Basiri et al. "Nature-inspired chiral metasurfaces for circular polarization detection and full-Stokes polarimetric measurements," Light: Science & Applications Accepted, 2019, 11 pages.
Christian et al. "Probabilistic Analysis to Quantify Optical Performance and Error Budgets for Next Generation Heliostats," Journal of Solar Energy Engineering, vol. 137, Jun. 2015, 8 pages.
Collado F.J. "Preliminary design of surrounding heliostat fields", Renewable Energy, vol. 34, No. 5., May 1, 2009, p. 1359-1363.
Noone et al. "Heliostat field optimization: A new computationally efficient model and biomimetic layout," Solar Energy, vol. 86, 2012, 86, pp. 792-803.
Eddhibi et al. "Optical study of solar tower power plants," J. Phys.: Conf. Ser. 596, 2015, 8 pages.
Kistler, B. L. "A User's Manual for DELSOL3: A Computer Code for Calculating the Optical Performance and Optimal System Design for Solar Thermal Central Receiver Plants," Sandia National Laboratories, Sandia Report No. SAND 86-8018, 1986, 239 pages.
Gurton et al. "Measured Degree of Infrared Polarization for a Variety of Thermal Emitting Surfaces," Army Research Laboratory, Adelphi, MD, Jun. 2004, 34 pages.
Hu et al. Polarization: Measurement, Analysis, and Remote Sensing XIII, Jun. 21, 2018, full document.

(56) References Cited

OTHER PUBLICATIONS

Perkins et al. "Signal-to-noise anaylsis of Stokes parameters in division of focal plane polarimeters," Optics Express, vol. 18, No. 25, Dec. 6, 2010, 10 pages.
"Bossa Nova Vision, Salsa, Full Stokes polarization camera," 2022 [retreived on Jan. 27, 2022]. Retreived from the internet: <URL: https://www.bossanovavision.com/homepage/polarization-cameras/salsa/>.
Gruev et al. "Dual-tier thin film polymer polarization imaging sensor," Optics Express, vol. 18, No. 18, Aug. 30, 2010, 12 pages.
Afshinmanesh, F. et al., Measurement of the polarization state of light using an integrated plasmonic polarimeter, Nanophotonics 2012, 1, (2), 125-129.
Arbabi, E. et al., Full-Stokes Imaging Polarimetry Using Dielectric Metasurfaces. ACS Photonics 2018, 5 (8), 3132-3140.
Balthasar Mueller, J. P. et al., Ultracompact metasurface in-line polarimeter. Optica 2016, 3 (1), 42-47.
Bassan, P. et al., Large scale infrared imaging of tissue micro arrays (TMAs) using a tunable Quantum Cascade Laser (QCL) based microscope. Analyst 2014, 139 (16), 3856-3859.
Chen, W. T. et al., Integrated plasmonic metasurfaces for spectropolarimetry. Nanotechnology 2016, 27 (22), 224002.
Dong, J. et al., Bi-layer cross chiral structure with strong optical activity and negative refractive index. Opt. Express 2009, 17 (16), 14172-14179.
Frank, B. et al., Large-Area 3D Chiral Plasmonic Structures. ACS Nano 2013, 7 (7), 6321-6329.
Fukuda, H. et al., Silicon photonic circuit with polarization diversity. Opt. Express 2008, 16 (7), 4872-4880.
Gansel, J. K. et al., Gold Helix Photonic Metamaterial as Broadband Circular Polarizer. Science 2009, 325 (5947), 1513-1515.
Garcia, N. M. et al., Surface normal reconstruction using circularly polarized light, Opt Express 2015, 23, (11), 14391-14406.
Gruev, V. et al., CCD polarization imaging sensor with aluminum nanowire optical filters. Opt. Express 2010, 18 (18), 19087-19094.
Guo, B. et al., Laser-based mid-infrared reflectance imaging of biological tissues. Opt. Express 2004, 12 (1), 208-219.
Gurton, K.P. et al., Enhanced facial recognition for thermal imagery using polarimetric imaging. 2014; vol. 39, p. 3857-3859.
Hou-Tong, C. et al., Reports on Progress in Physics 2016, 79, (7), 076401.
Hu, J. et al., All-dielectric metasurface circular dichroism waveplate. Scientific Reports 2017, 7, 41893.
Ichimoto, K. et al., Polarization Calibration of the Solar Optical Telescope onboard Hinode. In The Hinode Mission, Sakurai, T., Ed. Springer New York: New York, NY, 2008; pp. 179-207.
Jin, L. et al., Noninterleaved Metasurface for (26-1) Spin- and Wavelength-Encoded Holograms. Nano Letters 2018, 18 (12), 8016-8024.
Kats, M. A. et al., Thin-Film Interference in Lossy, Ultra-Thin Layers. Opt. Photon. News 2014, 25 (1), 40-47.
Khorasaninejad, M. et al., Metalenses at visible wavelengths: Diffraction-limited focusing and subwavelength resolution imaging, Science 2016, 352, (6290), 1190-1194.
Kikuta et al., "Achromatic quarter-wave plates using the dispersion of form birefringence," Applied Optics, vol. 36, issue 7, Mar. 1, 1997, pp. 1566-1572.
Kunnen, B. et al., Application of circularly polarized light for non-invasive diagnosis of cancerous tissues and turbid tissue-like scattering media. Journal of Biophotonics 2015, 8 (4), 317-323.
Lee, K. et al., Ultracompact Broadband Plasmonic Polarimeter. Laser Photonics Reviews 2018, 12 (3), 1700297.
Li, W. et al., Circularly polarized light detection with hot electrons in chiral plasmonic metamaterials. Nat Commun 2015, 6, 8379.
Li, Z. S. et al., Detection of methane with mid-infrared polarization spectroscopy. Applied Physics B 2004, 79 (2), 135-138.
Liang, G. et al., Monolithic Semiconductor Lasers with Dynamically Tunable Linear-to-Circular Polarization. ACS Photonics 2017, 4 (3), 517-524.
Lueder, E., "Electro-optic Effects in Twisted Nematic Liquid Crystals," Liquid Crystal Displays : Addressing Schemes and Electro-Optical Effects, John Wiley Sons, Incorporated, 2010.
Zhu, A. Y. et al., Giant intrinsic chiro-optical activity in planar dielectric nanostructures. Light: Science &Amp; Applications 2018, 7, 17158.
Nordin et al., "Broadband form birefringent quarter-wave plate for the mid-infrared wavelength region," Optics Express, vol. 5, No. 88, Oct. 11, 1999, pp. 163-169.
PCT Written Opinion of the International Searching Authority and International Search Report dated Jun. 20, 2019 in corresponding PCT Application No. PCT/US2018/067109, 11 pages.
Sato et al., "Compact ellipsometer employing a static polarimeter module with arrayed polarizer and wave-plate elements," Applied Optics, vol. 46, No. 22, Jul. 6, 2007.
Zhao et al., "Manipulating light polarization with ultrathin plasmonic metasurfaces," Physical Review, B 84 205428, Nov. 16, 2011.
Martinez, N. J. et al., Single photon detection in a waveguide-coupled Ge-on-Si lateral avalanche photodiode Opt Express 2017, 25, (14), 16130-16139.
Nafie, L.A. et al., "Vibrational circular dichroism," Journal of the American Chemical Society, vol. 98, pp. 2715-2723, doi:10.1021/ja00426a007 (1976).
Patel, R. et al., Polarization-Sensitive Multimodal Imaging for Detecting Breast Cancer. Cancer Research 2014, 74 (17), 4685-4693.
Pfeiffer, C. et al., Bianisotropic Metasurfaces for Optimal Polarization Control: Analysis and Synthesis. Phys Rev Appl 2014, 2 (4).
Pors, A. et al., Plasmonic metagratings for simultaneous determination of Stokes parameters. Optica 2015, 2 (8), 716-723.
Roberts, K. et al., Performance of Dual-Polarization QPSK for Optical Transport Systems. Journal of Lightwave Technology 2009, 27 (16), 3546-3559.
Rubin, N. A. et al., "Matrix Fourier optics enables a compact full-Stokes polarization camera," Research Article, Science, 2019, vol. 365, No. 43, Issue 6448, 10 pages.
Rubin, N. A. et al., Polarization state generation and measurement with a single metasurface. Opt. Express 2018, 26 (17), 21455-21478.
Salomatina-Motts, E. et al., Multimodal polarization system for imaging skin cancer. Optics and Spectroscopy 2009, 107 (6), 884-890.
Schaefer, B. et al., Measuring the Stokes polarization parameters. American Journal of Physics 2007, 75 (2), 163-168.
Short, N. et al., Improving cross-modal face recognition using polarimetric imaging. Opt Lett 2015, 40 (6), 882-885.
Tamura, M. et al., First Two-Micron Imaging Polarimetry of β Pictoris, The Astrophysical Journal, 2006, 641: 1172-1177.
Tang, Y. et al., A. E., Enhanced Enantioselectivity in Excitation of Chiral Molecules by Superchiral Light. Science 2011, 332 (6027), 333-336.
Tyo, J. S. et al., Review of passive imaging polarimetry for remote sensing applications. Appl. Opt. 2006, 45 (22), 5453-5469.
Whitmore, L. et al., Protein secondary structure analyses from circular dichroism spectroscopy: Methods and reference databases. Biopolymers 2008, 89 (5), 392-400.
Wu, P. C. et al., Versatile Polarization Generation with an Aluminum Plasmonic Metasurface. Nano Letters 2017, 17 (1), 445-452.
Yang, Z. et al., Generalized Hartmann-Shack array of dielectric metalens sub-arrays for polarimetric beam profiling. Nature Communications 2018, 9 (1), 4607.
Yeh, P., "Electromagnetic Propagation in Birefringent Layered Media," J Opt Soc Am, 1979, vol. 69, No. 5, pp. 742-756.
Yu, N. et al., A Broadband, Background-Free Quarter-Wave Plate Based on Plasmonic Metasurfaces. Nano Letters 2012, 12 (12), 6328-6333.

\* cited by examiner

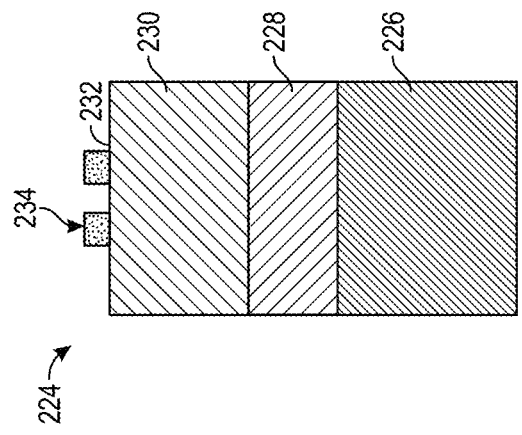
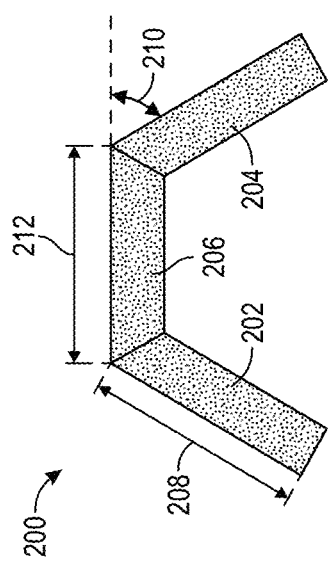
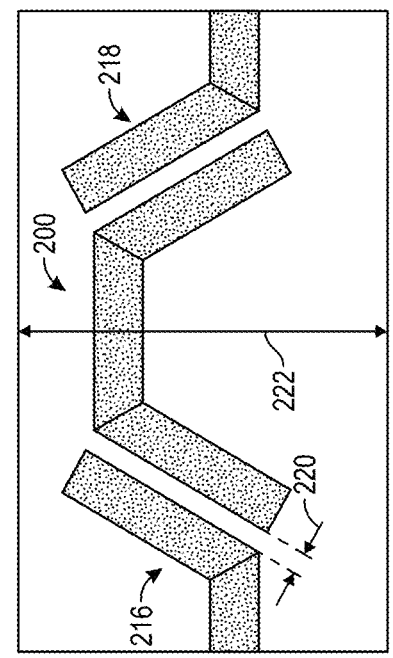
FIG. 2A
FIG. 2B
FIG. 2C

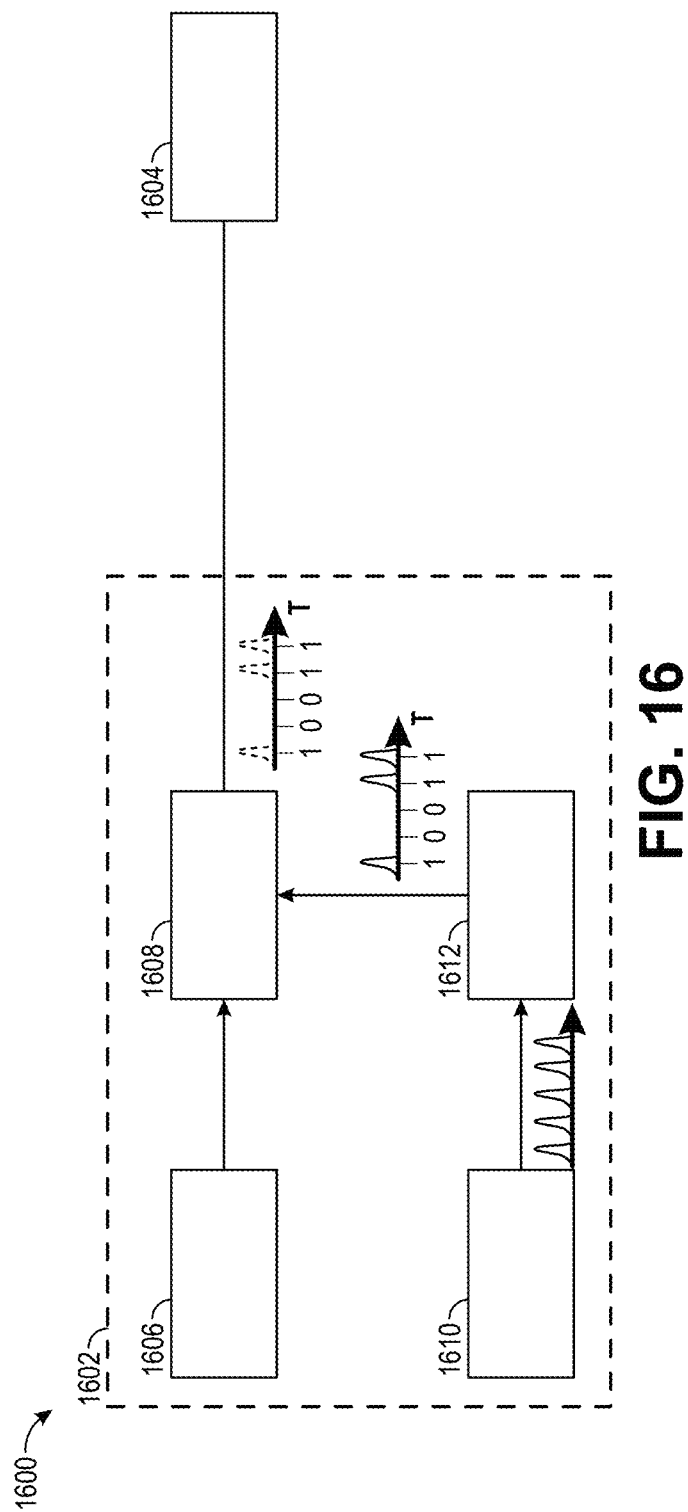

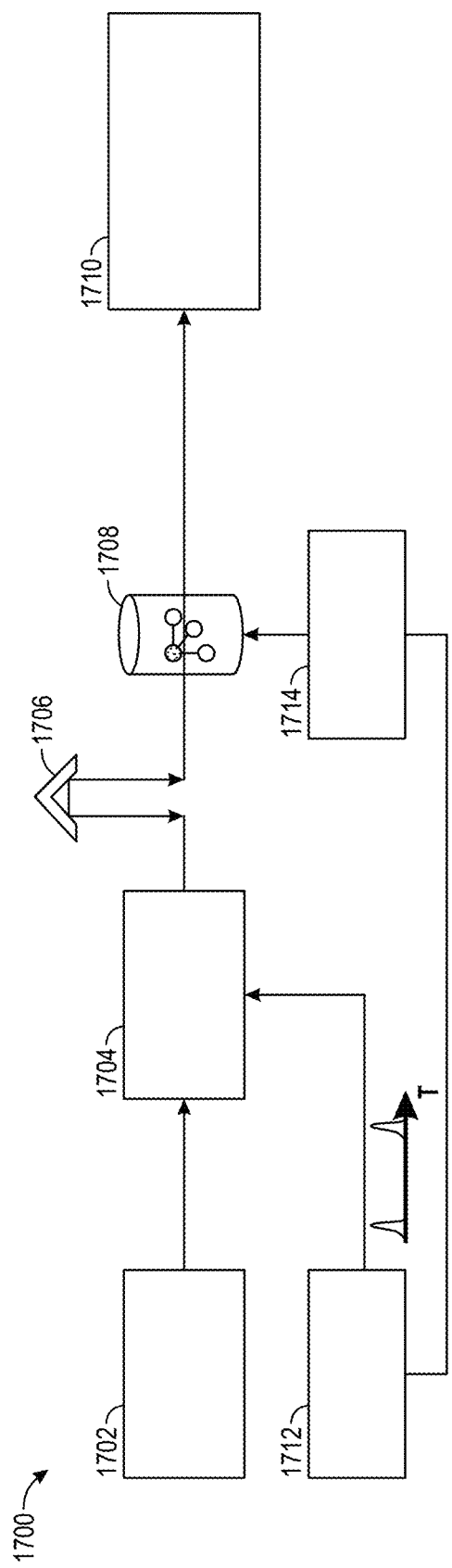

ULTRA-FAST OPTICAL MODULATION AND ULTRA-SHORT PULSE GENERATION BASED ON TUNABLE GRAPHENE-PLASMONIC HYBRID METASURFACES

RELATED APPLICATIONS

This patent application claims priority to U.S. Provisional Patent Application No. 63/002,939 filed Mar. 31, 2020 and entitled "ULTRA-FAST OPTICAL MODULATION AND ULTRA-SHORT PULSE GENERATION BASED ON TUNBLE GRAPHENE-PLASMONIC HYBRID METASURFACES." The 63/002,939 application is hereby incorporated by reference in its entirety.

STATEMENT OF GOVERNMENT INTEREST

This invention was made with government support under FA9550-16-1-0183 and FA9550-18-1-0475 awarded by the Air Force Office of Scientific Research. The government has certain rights in this invention.

TECHNICAL FIELD

This invention relates to devices and methods for ultrafast modulation of light in infrared (e.g., near-infrared, mid-infrared) to terahertz spectral region with sub-picosecond response times via ultrafast modulation of hot carriers in monolayer graphene, integrated on a plasmonic metasurface of nanoantenna arrays.

BACKGROUND

Generation of ultra-short pulses is in demand for a variety of applications ranging from telecommunication and optical computing to ultrafast science and high-resolution spectroscopy. In spite of the relative maturity of ultra-short pulse generation in the visible and near-infrared regions of the electromagnetic (EM) spectrum, there is still a deficiency of such sources in the mid-infrared spectral range (~2-20 μm) as well as devices operable utilizing all-optical modulation.

Graphene is an attractive material for all-optical modulation because of its ultrafast response, broad wavelength coverage from visible to terahertz (THz) and compatibility with various substrates. However, known optically pumped graphene modulators still require high optical pumping fluence (~>1 mJ/cm$^2$) due to ultrashort photo-carrier lifetime and limited optical absorption in monolayer graphene.

Optical modulation of electromagnetic waves is an important ingredient for many applications including optical interconnects, medicine, security, ultrafast molecular spectroscopy, material processing, quantum information, optical computation, information processing, and the like. All-optical modulation enables ultrafast response times compared to other methods to manipulate optical properties of materials based on thermal, magnetic, acoustic, mechanical and electrical effects, with a modulation rate of >200 GHz and enables direct integration with optical fibers and waveguides to achieve low dissipation and power consumption, as well as broadband operation. An advantage of circumventing optical to electrical data conversions is the facilitation of low noise optical communications. While all-optical modulation has been demonstrated based on colloidal plasmonic semiconductor nanocrystals, chains of silicon nanoantennas, Tamm-plasmon resonance, two-photon absorption in Ge-on-Si waveguides, 2D array of holes in silicon membrane, hot carrier effects of silver nanorods in PVA film, it remains challenging to achieve ultrafast all-optical modulators with ultra-compact form factor and low pump fluence, particularly in the mid- and far-infrared wavelength range due to inherent optical absorptions and small modulation effects of conventional materials used for optical modulation.

Graphene is an attractive material for ultrafast optical modulation over a broad wavelength range from visible to terahertz (THz) and is compatible with a variety of substrates. Graphene possesses ultrafast carrier relaxation on a picosecond time scale due to strong quantum confinement, enhanced carrier-carrier interaction, and the presence of massless Dirac fermions due to its linear dispersion. Furthermore, the optical properties of graphene can be flexibly tuned by electrical gating or optical pumping, which makes it suitable for optical modulation devices as well as other tunable devices. Moreover, due to its linear and gapless dispersion relation, graphene interacts with a broad range of electromagnetic waves from ultraviolet to microwave regime; thus, it holds the promise to fill the deficiency of high-speed optical modulators over broad spectral regions, and especially for mid-infrared and far-infrared wavelength ranges. The mid-IR wavelength range is associated with the vibrational transitions of a number of molecules and is therefore of interest for non-destructive characterization of the chemical composition in industrial quality control, chemical sensing, biomedical diagnosis and astronomical applications.

State-of-the-art graphene-based optical modulators can be classified in three major categories: a) electrically pumped modulators with the maximum speed of ~30 GHz—yet theoretically up to 100 GHz, limited by the RC constant of the external control circuit; b) thermo-optical modulators with a response time of few hundreds of nanoseconds or slower (i.e. ~1 MHz); and c) all-optical modulators with much faster response time (>200 GHz). Despite this significant improvement of modulation speed, all-optical modulators require high pump fluence (0.69-212 mJ/cm$^2$), high insertion loss (~0.004-5.9 dB/μm) and are associated with a tradeoff between modulation depth and interaction length (0.0002-0.21 dB/μm).

In the telecommunication wavelength region, centered at 1.55 μm, graphene-based all optical modulators have been implemented via graphene-clad microfiber, stereo graphene-microfiber, dielectric-loaded waveguide with graphene-silicon heterojunction, enhanced all-optical cavity-tuning using graphene, graphene-plasmonic slot waveguide, etc. Moreover, in THz regime, where graphene has a higher absorption, all-optical modulation has been illustrated based on graphene on germanium structure, as well as in reflection-mode devices based on a thin film absorber covered by graphene. These examples show great promise for realizing ultrafast optical modulation with graphene, yet the required pump fluence, also referred to as pump power density, is usually very high, on the order of 0.69-212 mJ/cm$^2$ (or 0.035-2.4 GW/cm$^2$). This inherent requirement is due to the limited optical absorption of approximately 2.3% in monolayer graphene and the ~1 picosecond or less ultrashort photocarrier lifetime associated with graphene.

Therefore, it would be advantageous to have a similar device enabling lower incident pump power or improved modulation depths within an all-optical, tunable, graphene-based device operable in the mid-IR range.

SUMMARY

This disclosure describes devices and methods for ultra-fast optical modulation and femtosecond/picosecond pulse generation for infrared (e.g., mid-infrared) to terahertz spectral region via ultrafast modulation of hot carriers in monolayer graphene, integrated on a plasmonic metasurface of nanoantenna arrays. In one example, the carrier concentration of graphene is derived out of equilibrium by a preceding 100-fs optical pump pulse at 1040 nm with ~11 nJ pulse energy (corresponding to a fluence of $$74 \frac{\mu J}{cm^2}\Big),$$

which results in a corresponding change in the surface conductivity of graphene, particularly in the mid-infrared (MIR) range. The interaction of incident s-polarized pump intensity with graphene is enhanced by nearly 100 times owing to the localized surface plasmon resonance (LSPR) excitation in nanoantenna arrays. As the optical properties of graphene change in time, the MIR resonance of the metasurface along the perpendicular axis blueshifts. This is associated with a transition from perfect absorption to almost complete reflection for the p-polarized continuous wave (CW) MIR probe (6-7 µm) within a few-hundred femtosecond time scale, exhibiting ultrafast modulation the device. All-optical mid-IR modulators with a 200 µm×200 µm device footprint and subwavelength thickness of ~600 nm have been fabricated. Experimental results suggest >10 dB modulation depth and a response time of less than 300 femtoseconds.

An optical device is disclosed. The optical device includes a silicon substrate, an aluminum oxide layer, an aluminum layer between the silicon substrate and the aluminum oxide layer, and a metasurface nanostructure. The metasurface nanostructure may include a graphene monolayer on the aluminum oxide layer and an electrically conductive nanoantenna array in direct contact with the graphene monolayer, where each nanoantenna in the nanoantenna array may include multiple segments, each segment having one or more parameters selected to achieve simultaneous resonance in the mid-infrared and the near infrared spectral regions when the graphene monolayer is irradiated with a near infrared pump pulse and a continuous mid-infrared probe. The optical device generates mid-infrared pulses via ultrafast modulation of hot carriers in the monolayer graphene.

Implementations of the optical device may have one or more parameters which may include: a length, a width, an angular orientation with respect to one or more adjacent segments, and a gap between one or more adjacent segments. The device achieves near field intensity enhancement of the near infrared pump pulse and the continuous mid-infrared probe exceeding 100 and 1500-fold, respectively. The continuous mid-infrared probe may be a coherent source or an incoherent source. The coherent source may be a laser. The incoherent source may be a thermal emitter. The mid-infrared pulses have a modulation time between about 100 femtoseconds and about 500 femtoseconds. The mid-infrared pulses have a modulation depth exceeding 10 db. A maximum dimension of each segment is 1000 nm or less. A wavelength of the resonance in the mid-infrared is tunable. The resonance in the mid-infrared is at a wavelength between about 5 µm and about 20 µm. A wavelength of the resonance in the near infrared is tunable. The resonance in the near infrared is at a wavelength of about 1 µm. The modulation may be all-optical. A polarization of the near infrared pump pulse and a polarization of the continuous mid-infrared probe are orthogonal. A thickness of the aluminum oxide layer is between about 300 nm and about 400 nm. The thickness of the aluminum oxide layer is about 350 nm. The nanoantenna array may include gold. The nanoantenna array may include a multiplicity of laterally coupled nanoantennas. The optical device is configured for optical communication, ultrafast pump probe measurement, or ultrafast molecular spectroscopy.

The details of one or more embodiments of the subject matter of this disclosure are set forth in the accompanying drawings and the description. Other features, aspects, and advantages of the subject matter will become apparent from the description, the drawings, and the claims.

BRIEF DESCRIPTION OF DRAWINGS

The accompanying drawings, which are incorporated in and constitute a part of this specification, illustrate embodiments of the present teachings and together with the description, serve to explain the principles of the disclosure.

FIGS. 2A-2C illustrate design parameters of an example Pi-shaped nanoantenna, according to an embodiment.

FIG. 16 is a schematic showing an optical modulation implementation for transmitters in high-speed high-capacity communication systems, according to an embodiment.

FIG. 17 is a schematic showing an optical modulation implementation for ultrafast infrared spectroscopy, according to an embodiment. Such an optical modulation 1700 may be useful for molecular spectroscopy, biochemistry study, material characterization, as well as other applications.

DETAILED DESCRIPTION

Figure 1A:
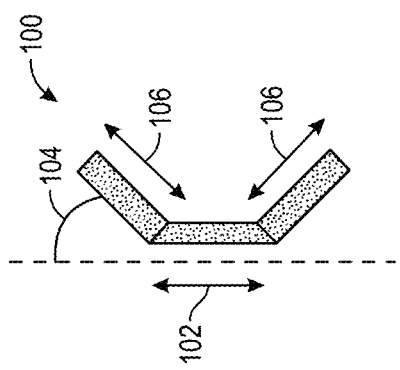
FIGS. 1A-1C illustrate a Pi-shaped nanoantenna and antenna resonance wavelength as a function of design parameters of the Pi-shaped nanoantenna, according to an embodiment.

This disclosure describes a double-enhanced modulator design based on graphene-metal hybrid plasmonic metasurface structures with strong light-graphene interaction at both pumping and probe, or signal wavelengths to simultaneously enhance modulation effect and reduce the pumping fluence. Certain embodiments demonstrate all-optical modulators operating at mid-infrared wavelengths with pumping fluence down to <100 µJ/cm2, which is 1-2 orders of magnitude lower than graphene all-optical modulators reported thus far. Compared with free-space all-optical modulators based on pure graphene samples, the double-enhanced device design, according to embodiments disclosed herein, also greatly enhance the modulation depth by over two orders of magnitude. Ultrafast pump-probe measurement suggests that such a design maintains the ultrashort response time of 1-2 ps, which is ultimately determined by the hot carrier relaxation channels in monolayer graphene. Further tailoring of the nanoantenna design enables graphene-based modulators for longer wavelength up to terahertz spectral regions, which have proven to be challenging in conventional modulator schemes. This double-enhanced modulator design concept can also be adapted to optical modulators based on other materials where the pumping efficiency and modulation depth could benefit from similar improvements.

In the metasurface design, according to embodiments described herein, closely coupled optical antennas were utilized to create nanoscale hot spots where the near field intensity of both pump and probe light are enhanced by a few orders of magnitude, thereby greatly improving the absorption of pump light and the modulation effects on the probe light. Based on this design concept, all-optical modulators operating at both near infrared (1560 nm) and mid infrared (6-7 µm) wavelengths with 7.9 (NIR) and 75 (MIR) µJ/cm² pump fluence/61 (NIR) and 580 (MIR) MW/cm² power density have been demonstrated, the features of which are greater than two orders of magnitude smaller than existing graphene all-optical modulators. These ultrafast pump-probe measurements at near infrared wavelengths also suggests that the response time of the devices according to embodiments described herein is about 1-2 picoseconds, and evidently determined by the hot carrier relaxation channels in monolayer graphene. Compared with free-space all-optical modulators based on pure graphene samples, the double-enhanced device design according to embodiments also greatly enhances the modulation depth by over two orders of magnitude. Additionally, further tailoring of the nanoantenna design enables graphene-based modulators covering a broad range of operational wavelength from visible to THz, which are challenging in conventional modulator schemes. This double-enhanced modulator design concept can also be adapted to optical modulators based on other materials to improve pumping efficiency and modulation depth.

Certain embodiments are directed to plasmonic metasurface structures to realize simultaneous enhancement of the light-graphene interaction at both pump and probe wavelengths based on localized surface plasmon resonance excitation. This approach dramatically reduces the pump fluence requirement and boosts the intended probe modulation, while still maintains the graphene ultrafast modulation speed. Devices exhibiting all-optical modulation for both near-infrared wavelength range centered at 1560 nm and mid-IR wavelengths at 6-7 µm with fast response time of only a few picosecond, low-consumption pump fluence of less than 8 µJ/cm², and highly enhanced modulation depths of 2-3 orders of magnitude higher than devices based on pure graphene samples, have been illustrated, according to embodiments disclosed herein.

This disclosure further describes all-optical devices for ultrafast infrared (e.g., mid-infrared) and up to terahertz spectral region pulse generation based on an optically controlled graphene-integrated metasurface. When pump light is incident on the graphene metasurface, the absorbed photons in graphene result in photo-generated carriers (Δn and Δp), which leads to a transient change in graphene optical conductivity and permittivity. Thus, the optical response of the graphene-metasurface hybrid structures is changed due to the photo-generated carrier. The ultra-fast carrier dynamics in graphene enables high speed all-optical modulators with sub-picosecond response time. Moreover, due at least in part to the strong light enhancement on graphene surface, the device configuration can be made very compact with only subwavelength-thickness.

An analytical model provides insight into the transient behavior and reveals the fundamental device physics of the modulator design. A complete time-domain full-wave simulation model is used to verify theoretical predictions. Theoretical and numerical studies illustrate that the overall modulation speed of the system is determined by the competing time constants of carrier relaxation dynamics in graphene and plasmonic damping of the metasurface structure. All-optical modulators with ultrashort response time (~300 fs) and high extinction ratio (>10 dB), with a subwavelength footprint (<$\lambda_0$/10) in the mid-infrared wavelength have been demonstrated. Tailoring of the nanoantenna design enables covering a broad range of operational bandwidth from infrared (1-12 µm) to terahertz frequencies.

As described herein, nanosecond mid-infrared pulses are generated via ultrafast all-optical modulation of hot carriers in monolayer graphene enabled by the absorption of NIR pump pulses in a metasurface nanostructure. The hot-carrier dynamics in graphene result in fast modulation of surface conductivity and overall device reflection, which leads to ultra-short MIR pulse generation. Subpicosecond pulses from hot carrier relaxation channels in graphene were indirectly observed. Methods of converting continuous MIR waves into ultra-short pulses using modulated surface conductivity can provide enhanced wavelength tunability and higher efficiency compared to approaches based on conventional nonlinearities.

Coupling Length and Bending Angle Dependence of the Wavelength Tuning Range

Figure 1C:
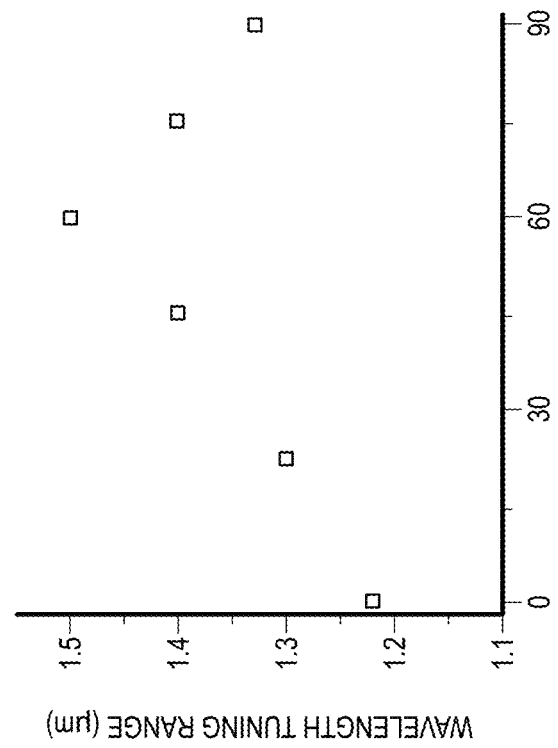
Figure 1B:
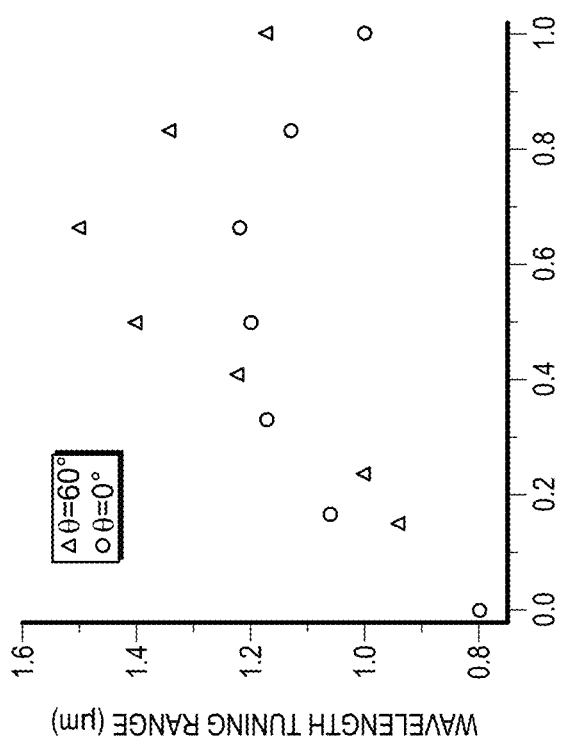

FIG. 1A illustrates a Pi-shaped nanoantenna 100, according to an embodiment described herein. FIG. 1B shows antenna resonance wavelength tuning ranges as a function of η for two different bending angles, θ=0° and 60°. The total antenna length is kept constant 2L1+L2≈1.2 µm when varying FIG. 1C shows antenna resonance wavelength tuning ranges as a function of bending angle θ, when L1≈L2≈0.4 µm, i.e., η=0.67. FIG. 1A illustrates the Pi-shaped nanoantenna 100 defining a middle segment length $L_2$ 102, a bending angle θ 104, and a coupling length $L_1$ 106. The coupling length $L_1$ and the bending angle θ are two tunable parameters in the structure optimization to increase the laterally coupled antenna resonance wavelength tuning range. η represents the ratio of the coupled sections to the total length of one antenna and is defined as:

$$\eta = \frac{2L_1}{2L_1 + L_2}$$

The wavelength tuning range obtained by finite-difference time-domain (FDTD) simulation is shown in FIG. 1B as a function of η. For structures with different bending angles, the maximum tuning range is achieved when η≈0.67, i.e., $L_1 \approx L_2$.

A parameter scan of bending angle is performed with a fixed η=0.67, and the results are plotted in FIG. 1C. It shows that structures with a bending angle θ≈60° have the widest tuning range, corresponding to the larger modulation depth given the same amount of generated photocarriers.

Although many implementations are possible, two implementations of designed structures are described here. FIGS. 2A-2C show additional design parameters of an example Pi-shaped nanoantenna. A first Pi-shaped nanoantenna 200 is illustrated in FIG. 2A, having a first side segment 202, a second side segment 204, and a middle segment 206. Indications of coupling length $L_1$ 208, bending angle θ 210, and middle segment length $L_2$ 212 are shown. FIG. 2B is a schematic of a repeating unit cell 214 illustrating the arrangement between the first Pi-shaped nanoantenna 200, a second pi-shaped antenna 216, and a third Pi-shaped antenna 218. FIG. 2C is a cross-sectional illustration of a device 224 according to an embodiment described herein. The device 224 has a silicon wafer layer 226, a back reflector aluminum layer 228, and a spacer layer 230 of aluminum oxide ($Al_2O_3$). On the spacer layer 230 a monolayer of graphene 232 is deposited, followed by a gold nanoantenna layer 234 in a structure similar to that illustrated in FIGS. 2A, 2B or according to other embodiments disclosed herein.

Generally speaking, based on FDTD simulations for the Pi-shaped antenna of FIGS. 2A-2C, MIR resonance blueshifts by increasing the bending angle 210, decreasing the antenna length 208, 212, increasing y-axis period ($P_y$) 222, increasing the antenna width, increasing the gap size 220, or decreasing the thickness of the aluminum oxide ($Al_2O_3$) layer 230. The back-reflector 228 Aluminum (Al) thickness can be at least 250 nm. The optimized spacer layer 230 aluminum oxide ($Al_2O_3$) thickness is about 350 nm. All layers are deposited on the silicon (Si) wafer 226. The above parameters correspond to a mid-infrared (MIR) resonance around 6.5 μm and a near infrared (NIR) resonance around 1 μm.

Figure 3A:
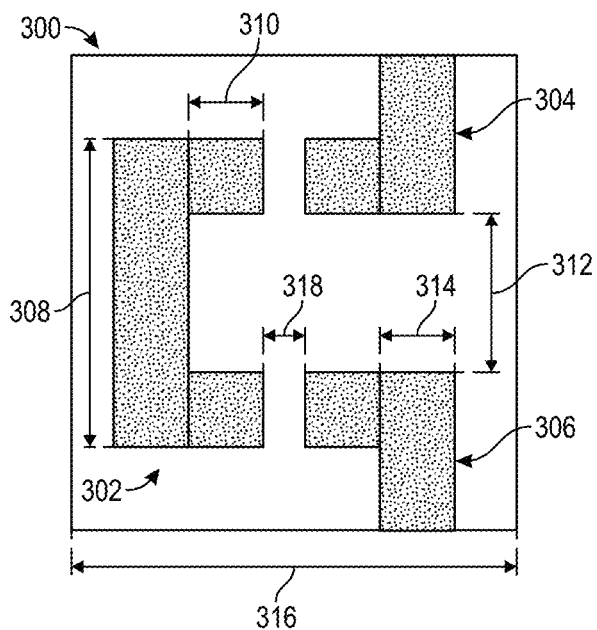
FIGS. 3A-3B illustrate design parameters of an example phone-handset-shaped nanoantenna, according to an embodiment.
Figure 3B:
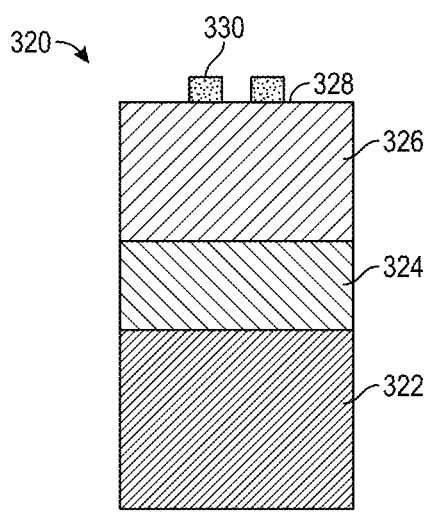

FIGS. 3A-3B show design parameters of an example phone-handset-shaped nanoantenna 302. FIG. 3A illustrates a top view of a repeating unit cell 300 including a first handset-shaped antenna 302, a portion of a second handset-shaped antenna 304, and a portion of a third handset-shaped antenna 306. The handset-shaped antennae 302, 304, 306 are similarly characterized by tunable parameters including a length of middle segment 308, an antenna width ($W_1$) 314, a handset width ($W_2$) 310, a y-axis gap ($G_y$) 312 between handset-shaped nanoantennae, an x-axis periodicity ($P_x$) 316, and an x-axis gap ($G_x$) 318. FIG. 3B is a cross-sectional illustration of a device 320 according to an embodiment described herein. The device 320 has a silicon wafer layer 322, a back reflector aluminum layer 324, and a spacer layer 326 of aluminum oxide ($Al_2O_3$). On the spacer layer 326 a monolayer of graphene 328 is deposited, followed by a gold nanoantenna layer 330.

The above parameters correspond to a MIR resonance around 6.5 μm and a NIR resonance around 1 μm. These structures have large near-field enhancements (and minimized on-resonance reflection dip) corresponding to NIR and MIR resonances, simultaneously. By tuning each of the indicated parameters, the depth and spectral location of resonance can be tuned to match with the pump and probe lasers. After CVD-grown graphene transfer, the MIR resonance blueshifts by nearly 0.4 eV on average, depending at least in part on the background doping during the transfer procedures. Hence, this may be considered for the design parameters in the absence of graphene.

As for the phone-handset-shaped nanoantenna of FIGS. 3A-3B, the MIR resonance blueshifts by increasing the y-axis gap ($G_y$) 312, increasing the x-axis gap ($G_x$) 318, increasing x-axis periodicity ($P_x$) 316 or decreasing $Al_2O_3$ spacer layer 326 thickness. On the other hand, NIR resonance mainly blueshifts by decreasing the antenna width ($W_1$) 314, decreasing handset width ($W_2$) 310 and decreasing y-axis gap ($G_y$) 312.

An approach for generating short pulses in the MIR based on fast optically driven modulation of carrier dynamics in graphene is described. To simulate the carrier dynamics in graphene and the consequent change in optical properties (graphene and metasurface surface conductivity), two approaches are considered: a) two-temperature model; and b) Liouville's theorem based on the graphene density matrix.

In two-temperature model, excitations in the electronic system and in the strongly coupled optical phonons (SCOPs) are considered, each characterized by its respective temperature, $T_{el}$ and $T_{op}$, and linked by the e-ph coupling:

$$\frac{dT_{el}(t)}{dt} = \frac{I(t) - \Gamma(T_{el}, T_{op})}{c_e(T_{el})}$$

$$\frac{dT_{op}(t)}{dt} = \frac{\Gamma(T_{el}, T_{op})}{c_{op}(T_{op})} - \frac{T_{op}(t) - T_0}{\tau_{op}}$$

In this description, the absorbed laser irradiance I(t) initially excites the electrons. Energy then flows into SCOPs at a rate described by:

$\Gamma(T_{el},T_{op})=\beta(1+n(T_{op})\int D(E)D(E-h\Omega)f(E,T_{el})(1-f(E-h\Omega,T_{el}))dE-n(T_{op})\int D(E)D(E+h\Omega)f(E,T_{el})(1-f(E+h\Omega,T_{el}))dE)$ This expression reflects the available phase space for electron scattering and includes only one adjustable parameter to describe the overall rate. Here $n(T_{op})$ represents SCOP population, $f(E,T_{el})$ id Fermi-Dirac distribution for electrons and $D(E)=2E/\pi(hv_F)^2$ is the electron density of states in graphene. β=5 $eV^2 cm^2 s^1$ for the best match with experiments. The specific heat of the electrons ($c_e$) and the SCOPs ($c_{op}$) are obtained, respectively, from theory and experimental data using Raman spectroscopy. The slower coupling of the SCOPs to other phonons has also been included using relaxation time $\tau_{op}$ estimated from time-resolved Raman measurements (~1.5 ps). The heating of these more numerous secondary phonons is neglected, with the assumption that they remain at the ambient temperature of $T_0$=300 K. The simulated behavior of maximum electronic temperature (designated as Te [K]—no diffusion) and SCOP temperature (designated as Tph [K]—no diffusion), are plotted and described later in reference to FIG. 9. Moreover, by adding lateral diffusion terms $$\left(D_e = D_{op} = 6.5e^{-4}\left[\frac{m^2}{s}\right]\right)$$

to the above coupled equations electronic and lattice temperatures (designated as Te [K]—with diffusion and Tph [K]—with diffusion, respectively) were observed to relax into equilibrium much faster (FWHM<300 fs).

In order to obtain the intensity modulation, the transient electronic temperature is calculated based on the thermodynamics of the system using the two-temperature model above. Next, based on the Fresnel equations the metasurface conductivity and the circuit model elements are found (based on a simple and intuitive RLC model). Having the electronic temperature from the above numerical calculation, the time-dependent metasurface conductivity is evaluated by incorporating the surface conductivity of graphene following the random phase approximation model. This gives the Fresnel reflection coefficient for the entire device as a function of time and frequency. The resulting reflection is a periodic signal with repetition rate corresponding to the pump laser (100 MHz) and subpicosecond FWHM, dominated by lateral diffusion in nanostructure and carrier-optical phonon scattering in graphene which eventually transfers energy to substrate. The comparison with the measured data using a PVI-2TE-10.6 (VIGO System S.A.) MIR fast photodetector and MDO3104 mixed domain oscilloscope (Tektronix) with 1 GHz bandwidth are demonstrated later in reference to FIGS. 12A-12B.

Embodiments of ultrafast all-optical modulation of mid-infrared light based on graphene-plasmonic hybrid metasurfaces are described herein. The interaction of incident fs-laser pulse with graphene is enhanced by nearly 100 times owing to the LSPR excitation in nanoantenna. As the optical properties of graphene change in time, the MIR resonance of the metasurface along the perpendicular axis blueshifts. This is associated with a transition from perfect absorption to almost complete reflection for the mid-infrared light within sub-picosecond time scale, thus resulting in ultrafast optical modulators with response times as short as 200-300 fs.

Figure 4A:
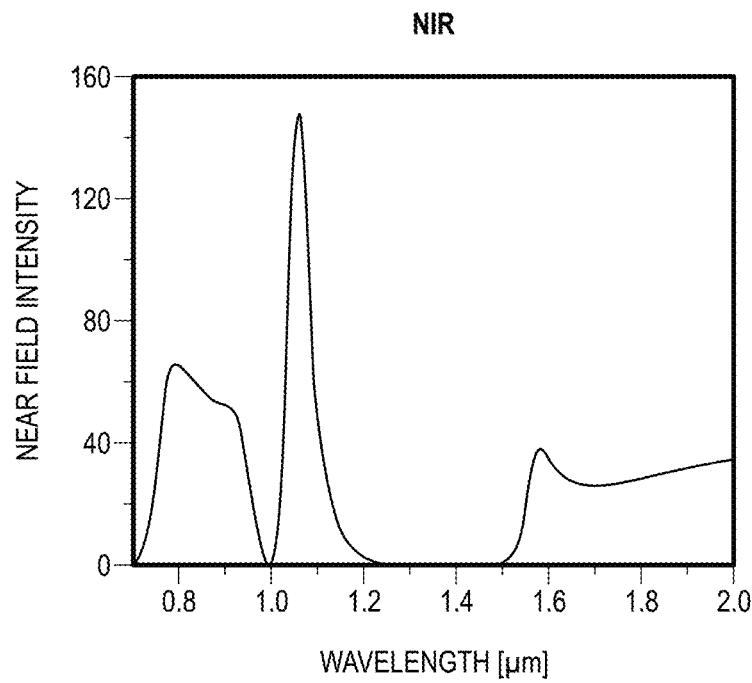
FIGS. 4A-4B are plots illustrating near-field enhancement in NIR and MIR regimes, respectively.
Figure 4B:
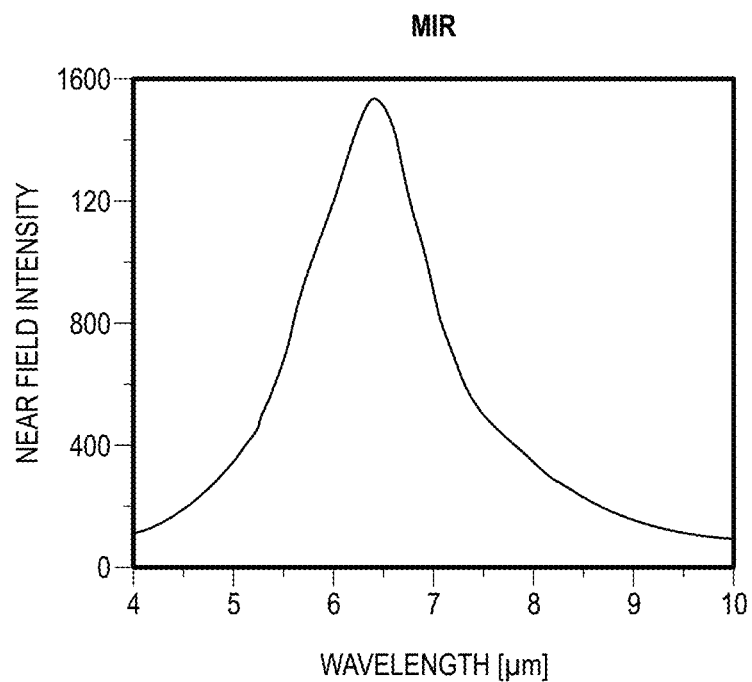

FIGS. 4A and 4B show simultaneous near-field intensity enhancement of both NIR pump pulse (1.04 µm) and MIR probe (6 to 7 µm) with perpendicular polarizations using nanoantenna structures described herein by nearly 150 and 1600 folds, respectively. This relaxes the requirement for high fluence incident pump and shows larger MIR modulation for the same pump power. The NIR resonance enhancement shown in FIG. 4A is close to pump wavelength at 1.04 µm, while the MIR resonance enhancement shown in FIG. 4B is within the operation wavelength of MIR probe laser (6-7 µm).

Figure 5A:
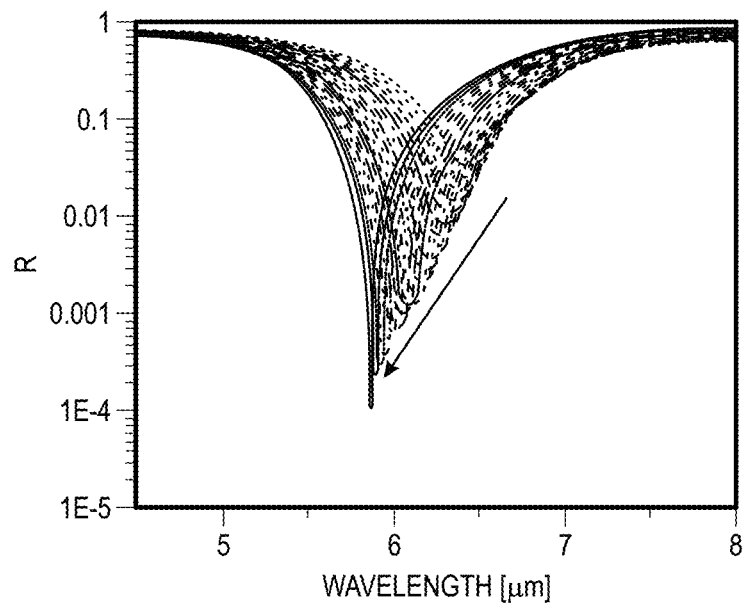
FIGS. 5A and 5B are plots showing reflection spectra and near-field enhancement, respectively, as a function of electronic temperature from 300 to 4700 K.
Figure 5B:
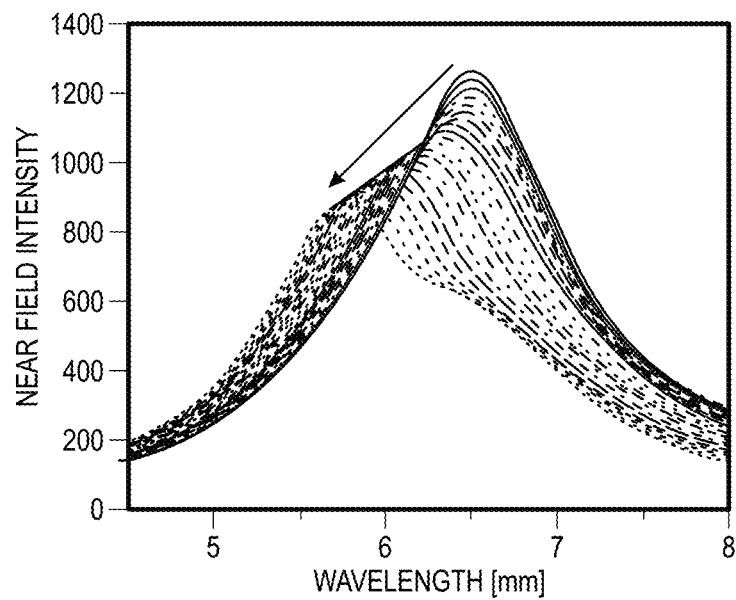

FIGS. 5A and 5B show reflection spectra and near-field enhancement as a function of electronic temperature from 300 to 4700 K. Combining the ultrafast carrier dynamics in monolayer graphene with strong nearfield enhancement enabled by integrating metasurface nanoantenna structure to form a metasurface perfect absorber, operating in reflection mode. This provides ~300 femtosecond modulation time and better than 10 dB modulation depth in experiment. FIG. 5A shows blueshift of MIR resonance due to change in graphene surface conductivity as the electronic temperature increases from equilibrium, indicated by the arrow. FIG. 5B shows the corresponding nearfield enhancement in the center of nanogap.

Figure 6:
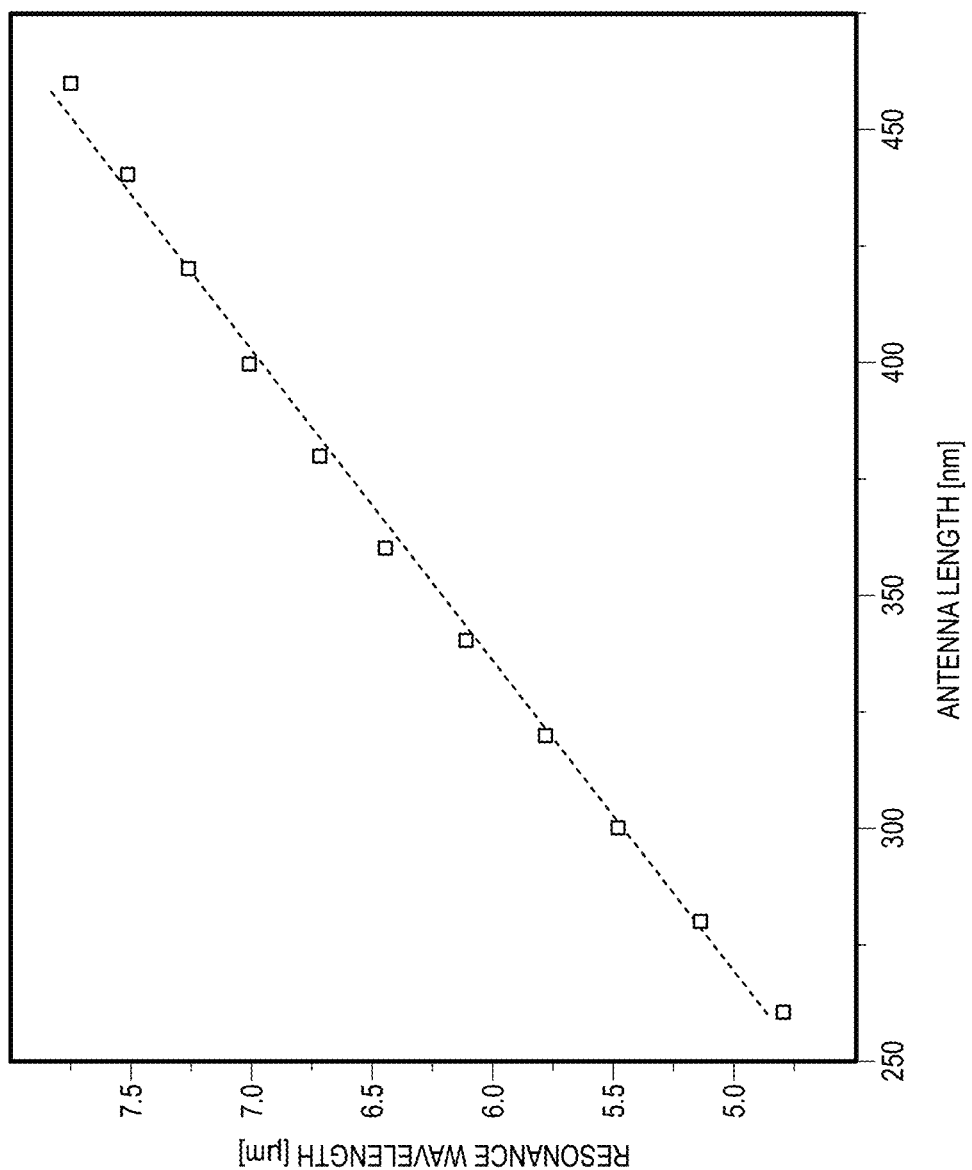
FIG. 6 is a plot illustrating tuning of the resonance wavelength of a Pi-shaped antenna in MIR range.

FIG. 6 shows the influence of tuning of the resonance wavelength of a Pi-shaped antenna in MIR range. The data points represent the nanoantenna resonance wavelength, corresponding to the minimum value of each reflection spectrum, as a function of nanoantenna length ($L_1=L_2$). The dashed line indicates a linear fit to data points. The data points represent the nanoantenna resonance wavelength, corresponding to the minimum value of each reflection spectrum, as a function of nanoantenna length ($L_1=L_2$). The dashed line indicates a linear fit to data points.

Figure 7A:
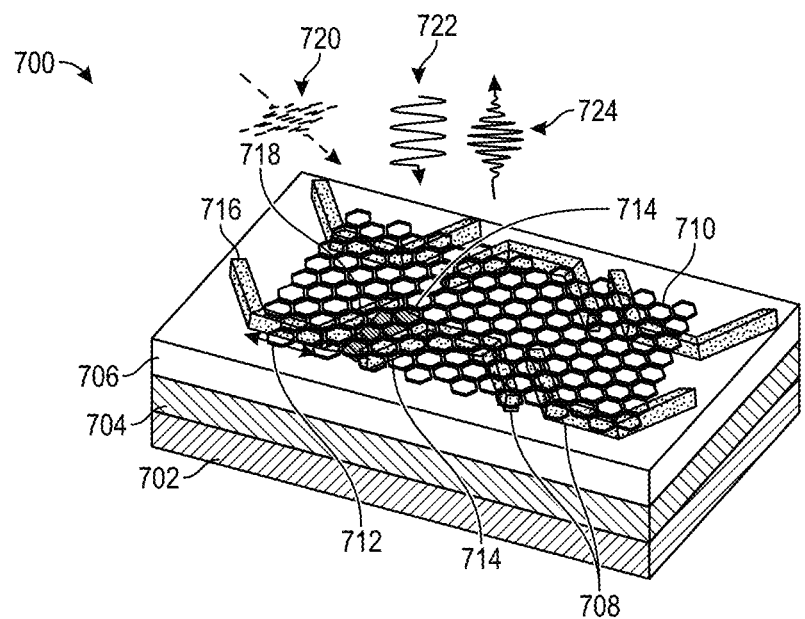
FIGS. 7A-7K are a series of figures illustrating simulation results of pump absorption and probe modulation for a modulation device, according to an embodiment.
Figure 7B:
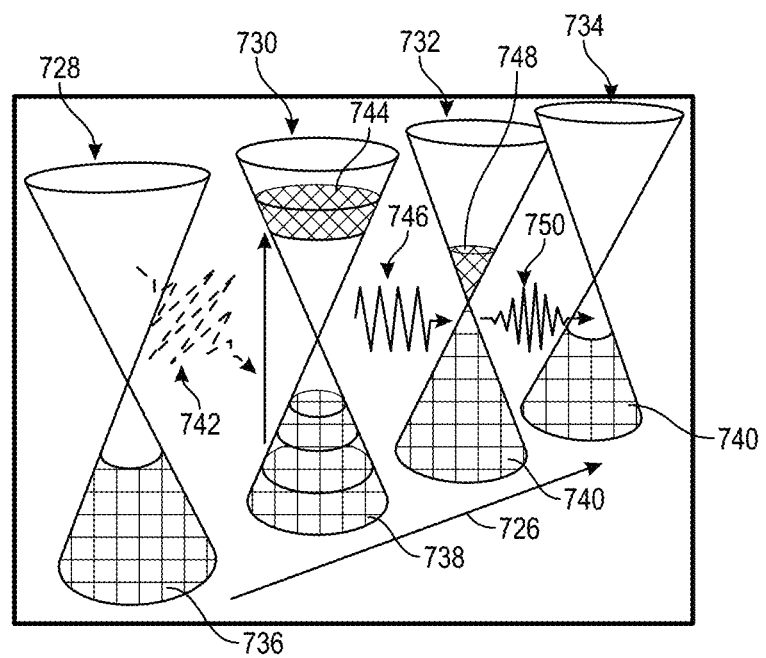

FIGS. 7A-7K are a series of figures illustrating simulation results of pump absorption and probe modulation for a modulation device, according to an embodiment. FIG. 7A shows a schematic of the design, which is composed of an aluminum back reflector 704, a dielectric spacer layer 706 (e.g., aluminum oxide) on a silicon wafer layer 702 to optimize the interference effects for maximum resonance absorption based on thin film multireflection model, a plasmonic metasurface formed by closely coupled optical antennas 708 and a graphene layer 710 on top. The modulation device 700 is arranged in a similar unit cell arrangement as previously described herein. Several dimensions, length $L_2$ 712, nanoantennae thickness 714, and width of each nanoantenna 716 are indicated. The preceding pump beam, $E_{y0}$ 720 excites the carriers out of equilibrium, generating hot carriers 718 in the valence and conduction bands. The subsequent relaxation of photogenerated carriers towards Dirac point blocks probe $E_{x0}$ 722 absorption on a ps time scale, hence making the graphene layer transparent to the probe pulse. Reflected radiation 724 is also indicated. The underlying mechanism in the modulation device 700 to demonstrate ultrafast and broadband all-optical modulation is related to the ultrafast carrier dynamics in graphene, initiated by the pump light 720, and the subsequent picosecond-scale absorption change of the probe light due to Pauli exclusion principle as shown in FIG. 7B. FIG. 7B illustrates simultaneous enhancement of pump and probe interactions with graphene in the nanogap region. The illustration in FIG. 7B illustrates the time-dependent interaction of pump and probe beams with graphene in the vicinity of the Dirac point. To reduce the pump fluence requirement while maintaining the ultrafast modulation speed, a double-enhanced all-optical modulator design was utilized where the light-graphene interaction is highly enhanced at both pump and probe wavelengths. Before the pump beam incidents onto the device, the carriers in graphene are in thermal equilibrium (728). The pump beam (742) excites the carriers out of equilibrium, generating hot carriers (744) in the valence (738) and conduction bands (730). The subsequent relaxation of photogenerated carriers (748) towards Dirac point change the optical response for the probe beam (746) on a picosecond time scale, hence resulting in ultrafast modulation of the probe beam in the picosecond time scale (750).

Figure 7E:
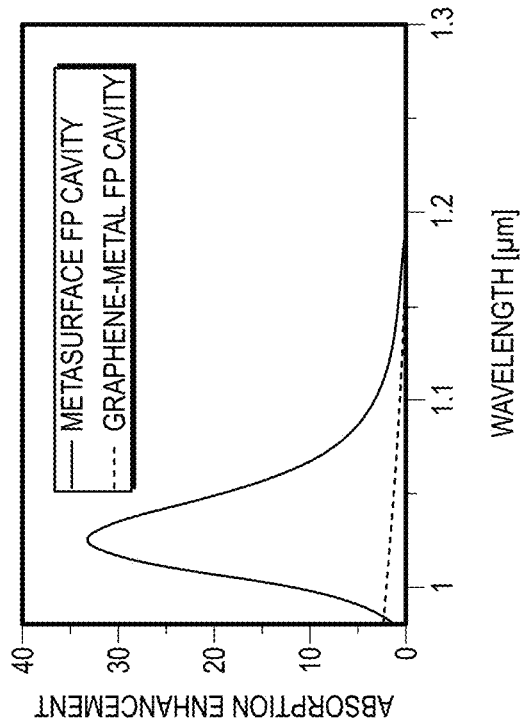
Figure 7F:
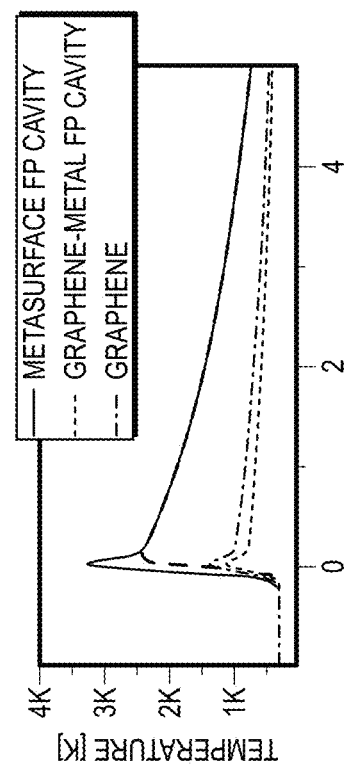
Figure 7C:
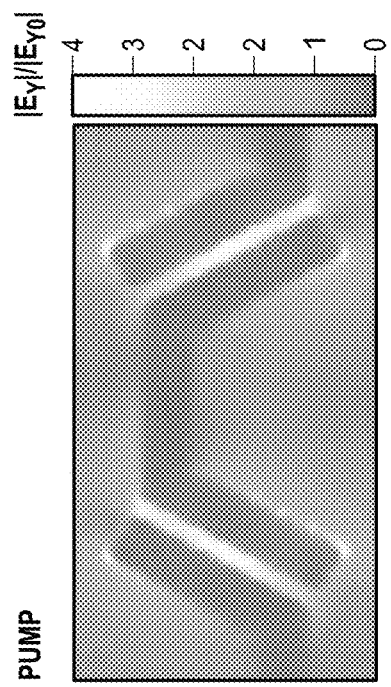
Figure 7D:
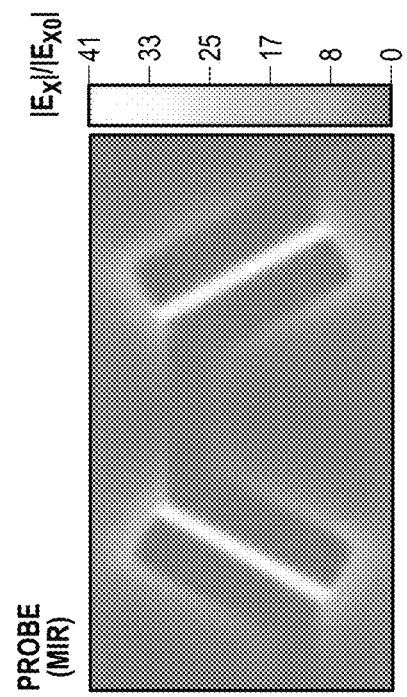

FIGS. 7C and 7D illustrate a nearfield enhancement illustration of electric field amplitude based on FDTD simulations, for 1040 nm pump and 6.8 probe beams, respectively. FIG. 7C shows the near field intensity enhancement at 1040 nm (S-polarized) and 6.8 µm (P-polarized) for the schematic design presented in FIG. 7A, where XZ is defined as the incident plane. It clearly indicates that both pump and probe nearfields are strongly enhanced inside the same nanogaps between the coupled nanoantennas. Thus, according to the simulation results, the design shown in FIG. 7A significantly enhances the absorption of pump light by graphene inside the nano-gaps, and also ensures that generated photo-carriers are strongly interacting with the probe light to achieve strongest modulation effects.

FIG. 7E illustrates absorption enhancement spectra on the graphene sheet at the nanoantenna hot spot center for S-polarization around pump wavelength at 1040 nm. The results show the absorption enhancement comparison for graphene on Fabry-Perot cavity with (Metasurface FP cavity) and without (Graphene-metal FP cavity) nanoantenna integration, with respect to suspended graphene as reference. FIG. 7F shows transient electronic temperatures from two-temperature model caused by the pump pulse with a similar comparison as shown in FIG. 7E, also shown with suspended graphene (Graphene) added. The dashed line corresponds to the phonon temperature dynamics as a results of heat transfer from hot electrons and their subsequent equilibrium for the case of Fabry-Perot cavity integrated with nanoantenna. In comparison to a suspended graphene sheet (Graphene) or an identical structure without the plasmonic nanoantenna (Graphene-metal FP cavity), more than 30 times increase of absorption can be achieved around the pump wavelengths. Absorption of the pump laser in graphene increases the electronic temperature from room temperature (~300 K) to a few thousands of Kelvin.

Figure 7G:
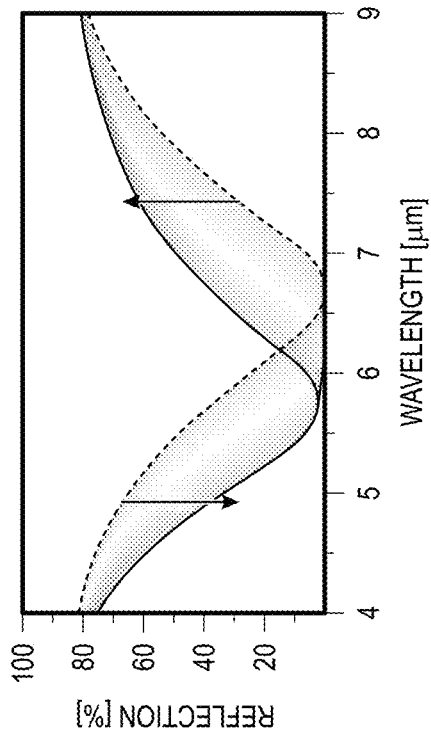
Figure 7H:
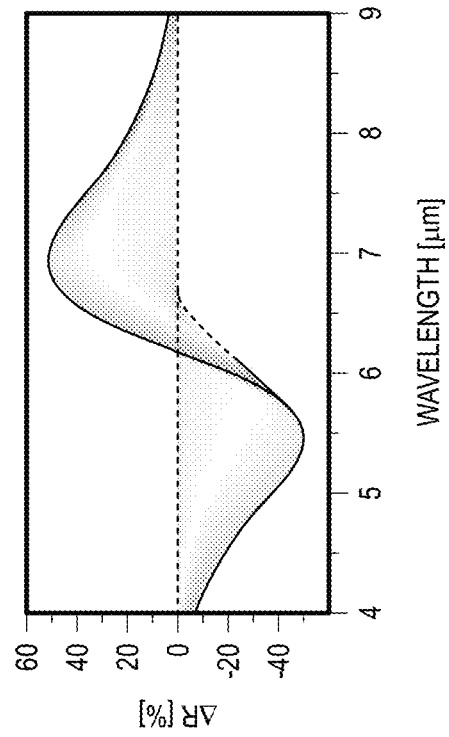

FIGS. 7G and 7H illustrate the real and imaginary parts of the graphene surface conductivity based on random phase approximation model, as a function of angular frequency and delay time in pump-probe measurements, respectively. The time dependence originates from the change of electronic temperature calculated by two-temperature model. To model the transient electronic temperature dynamics in graphene, a two temperature model (TTM)[32] which studies the photocarrier generation in graphene was used, induced by the preceding femtosecond pump pulse, and its subsequent thermal relaxation to the optical, within hundreds of fs, and acoustic, within few ps, phonons, respectively. Due to the localized surface plasmon resonance excitation in the gold nanoantenna and the subsequent strong nearfield enhancement, the temperature perturbation is significantly larger than pure graphene regions. This, in turn, results in significant optical tuning of the graphene surface conductivity. The real and imaginary components of graphene surface conductivity at equilibrium (300 K), maximum achieved electronic temperature (~3300 K) and a point between them, were obtained by random phase approximation. This indicates that a larger electronic temperature in graphene corresponds to a larger tuning in its optical surface conductivity, compared to the room temperature.

Figure 7I:
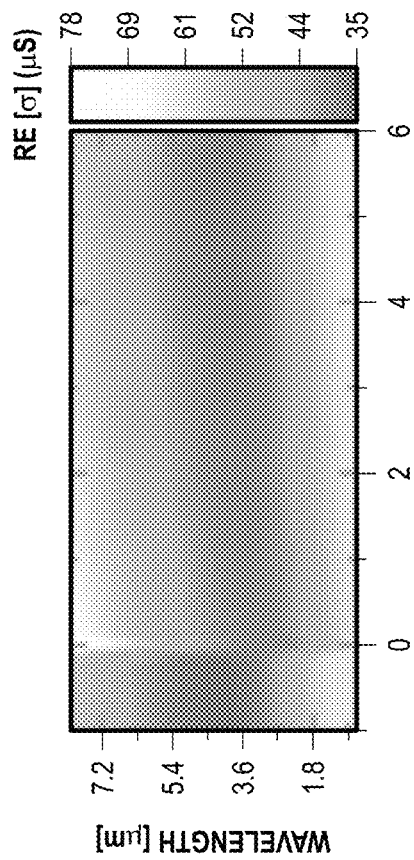
Figure 7J:
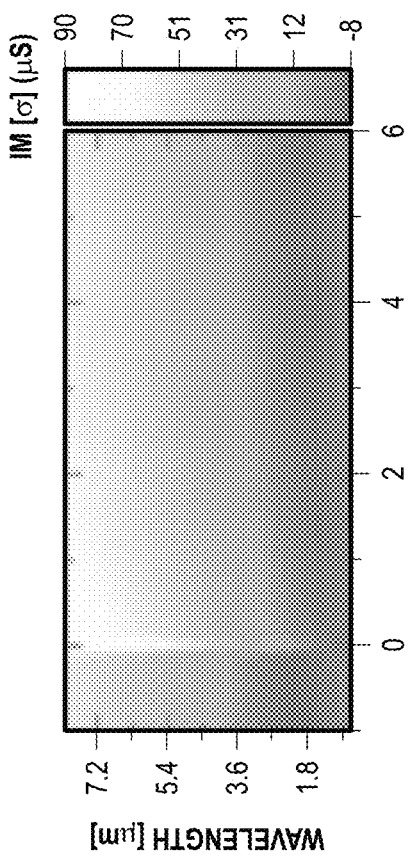

By contrast, the above increase in the electronic temperature of graphene corresponds to the blueshift of the metasurface absorption resonance. FIGS. 7I and 7J illustrate reflection spectra and modulation depth, respectively, of the mid-IR modulator of FIG. 7A as a function of wavelength at various electronic temperatures. Elevation of electronic temperature corresponds to the blueshift of the metasurface perfect absorber wavelength. The electronic temperature variation range is from 300 K to 3300 K, indicated by a gradient palette. Here, the simulation results of reflection spectra were obtained by inserting the transient electronic temperatures from TTM into the FDTD simulator (Lumerical Inc.). Without the pump light, the probe light wavelength is in resonant with the graphene-metallic hybrid plasmonic metasurface absorber and thus mostly absorbed. When the pump light is incident on the graphene metasurface, the photo-generated carriers (Δn and Δp) in conduction and valence bands result in changes of graphene optical conductivity. This in turn leads to blue shifts of the resonance wavelengths and increased reflection at the probe wavelength. This demonstrates that the wavelengths shorter than the structure resonance wavelength experience a negative differential modulation, while the longer ones exhibit a positive one, as shown in FIG. 7J.

Figure 7K:
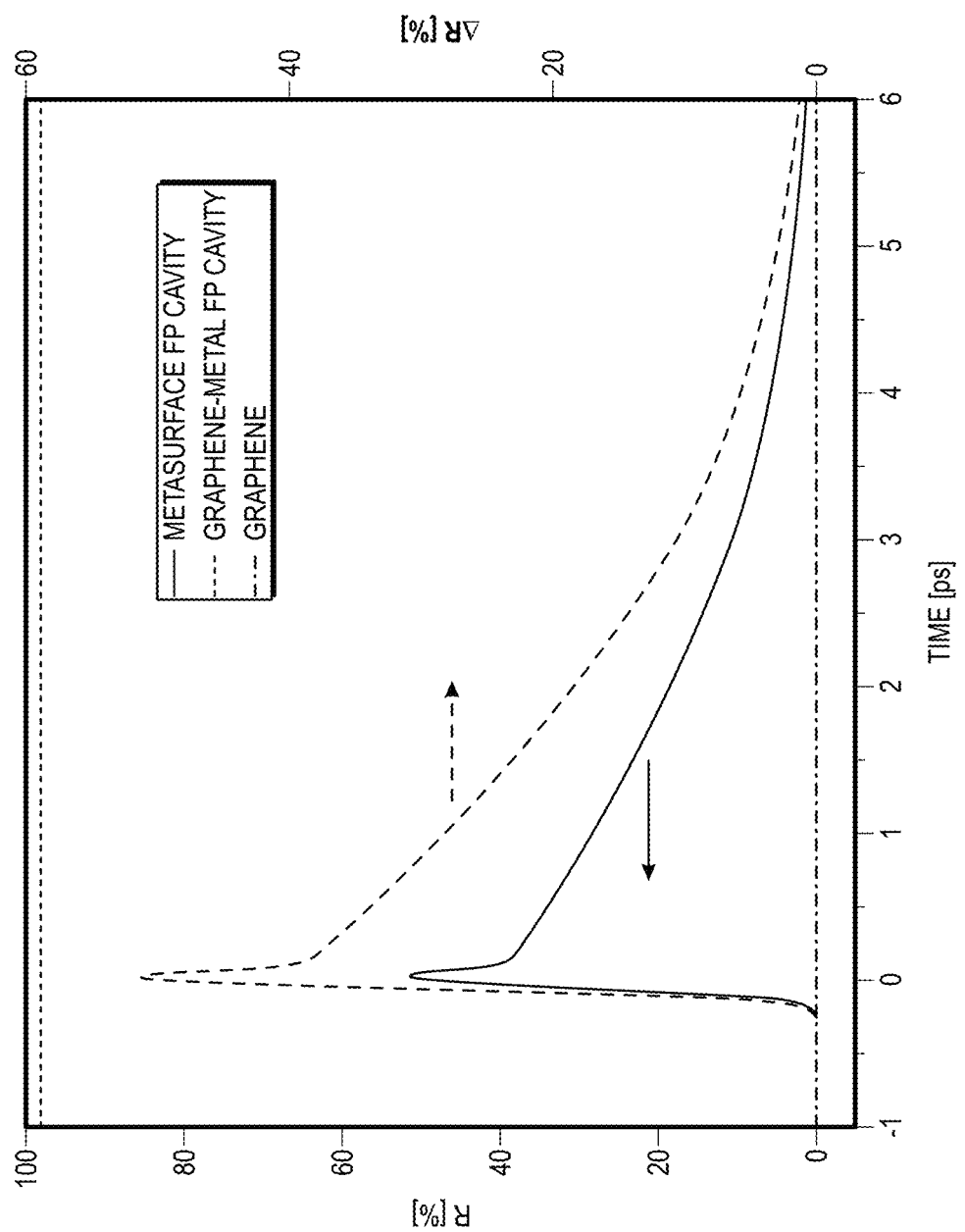

FIG. 7K illustrates reflection and differential reflection modulation of probe beam for graphene on Fabry-Perot cavity with (Metasurfave FP cavity) and without (Graphene-metal FP cavity) nanoantenna, and for suspended graphene (Graphene). As mentioned previously, the response time of the modulator device of FIG. 7A is mainly determined by the ultrafast photocarrier dynamics in graphene. To demonstrate the dependence of reflection (R) modulation on time, the reflection, as illustrated in FIG. 7I, is extracted at the probe wavelength, ~6.8 µm, corresponding to the electronic temperatures at each time step as shown in FIG. 7F.

FIG. 7K shows that the reflection off the metasurface FP cavity (solid black curve) reaches to around 50% right after the pump onset and returns to complete equilibrium over about 6 ps. For the sake of comparison, we have plotted the reflection transience of a suspended graphene sheet (solid blue curve) and the same FP cavity without the nanoantenna pattern (solid red curve). As expected, the former structure is primarily transparent, while the latter one is majorly reflective with negligible time dependence. The corresponding modulation contrast (ΔR) defined by the difference between the equilibrium state and the peak of transient reflection for each scenario is plotted by dashed lines on the right axis of FIG. 7K. The strong modulation contrast for the metasurface FP cavity compared to the other two structures relies on nanoantenna-assisted enhanced absorption by about 30 times and the resulting change in graphene optical properties, shown in FIGS. 7E-7H, as well as high sensitivity of the reflection spectral tuning at the probe wavelength after the onset of pump, due to the carefully engineered Pi-antenna design.

Figure 8:
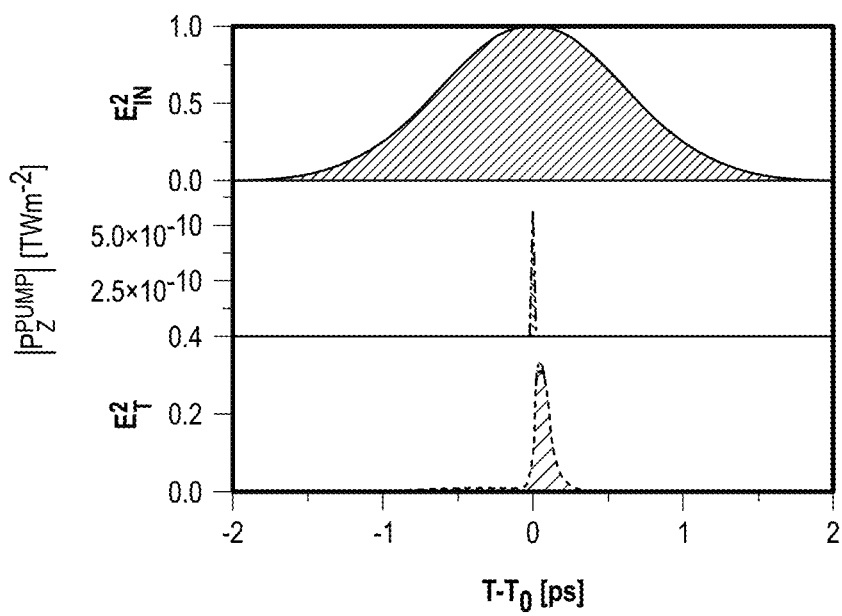
FIG. 8 illustrates a time-domain representation of ultrafast modulation, according to an embodiment.

FIG. 8 illustrates a time-domain representation of ultrafast modulation, according to an embodiment. The top portion of the plot shows incident electric field intensity, the middle portion of the plot illustrates an ultrashort NIR pump pulse, and the bottom portion of the plot shows a reflected electric field intensity, showing transient dependence of reflection spectra on ultrafast carrier dynamics in graphene. This simulation has been modeled using full-wave time-domain approach in COMSOL Multiphysics.

Figure 9:
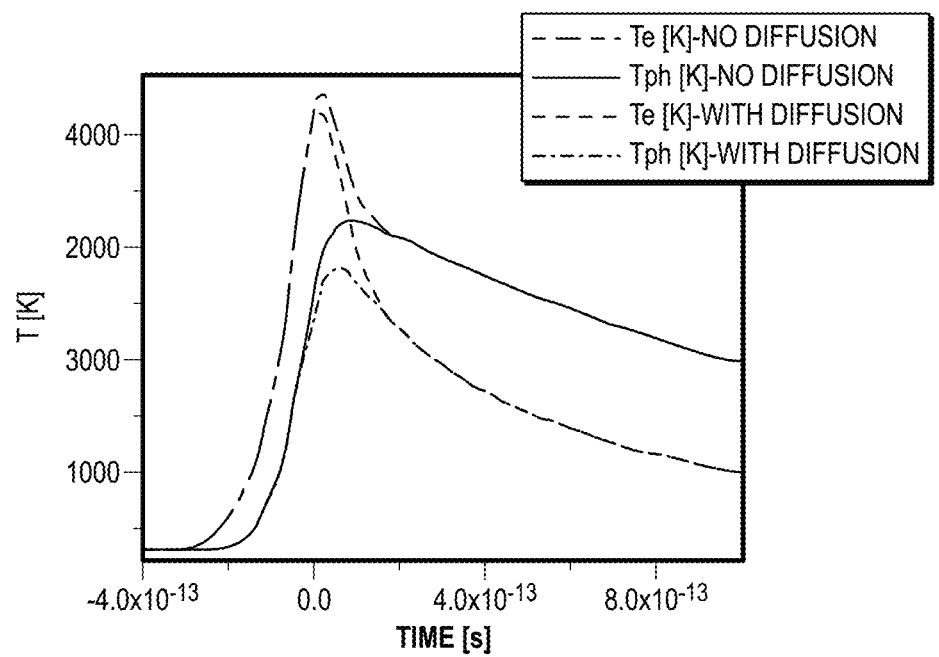
FIG. 9 illustrates an additional plot of electron ($T_e$) and phonon ($T_{ph}$) temperatures vs time using a two-temperature model, according to an embodiment.

FIG. 9 illustrates an additional plot of electron ($T_e$) and phonon ($T_{ph}$) temperatures vs time using a two-temperature model, according to an embodiment as described herein. The plot shows the transient elevation of electronic temperature in graphene due to pump excitation and the subsequent decay due to interaction with phonons. The curves labelled $T_e$ [K]-no diffusion and $T_{ph}$ [K]-no diffusion indicate a thermodynamic approach for a uniform surface, while the curves labelled $T_e$ [K]-with diffusion and $T_{ph}$ [K]-with diffusion correspond to the case where the lateral diffusion of highly excited photocarriers in antenna nanogaps to surrounding regions with room temperature is also considered.

Figure 10A:
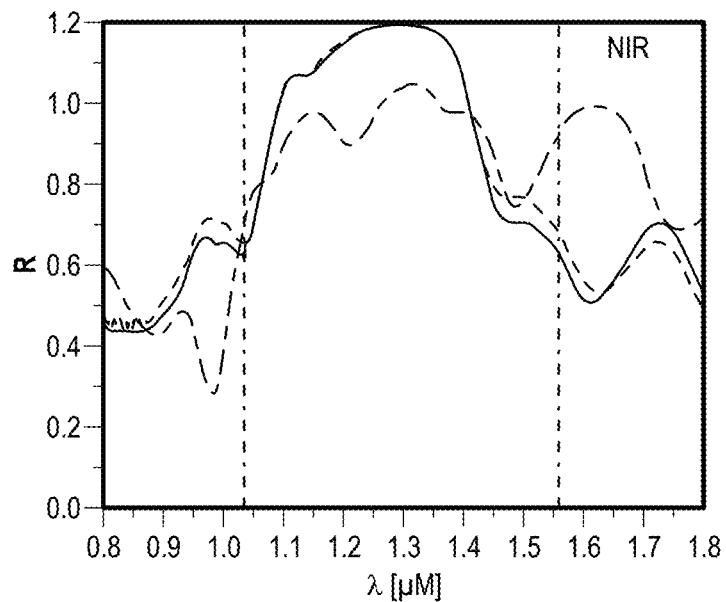
FIGS. 10A and 10B show FTIR reflection spectra in NIR and MIR spectral range, respectively, corresponding to pump and probe wavelengths for an embodiment.
Figure 10B:
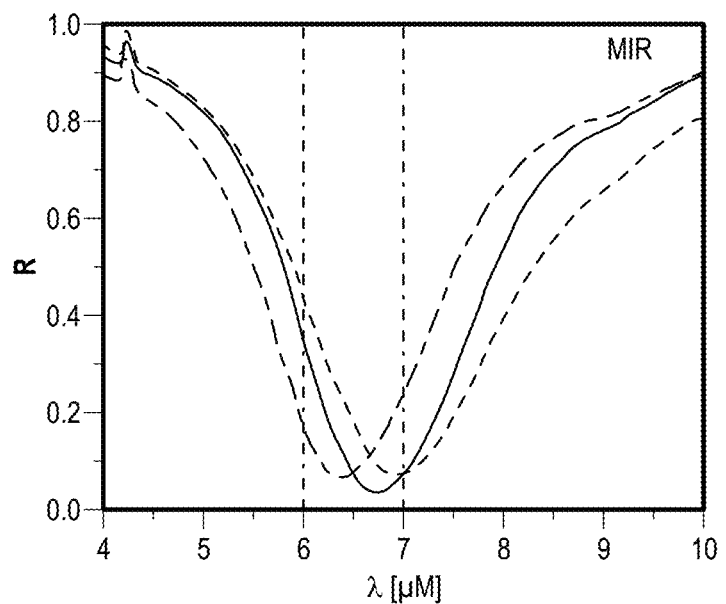

FIGS. 10A and 10B show FTIR reflection spectra in NIR and MIR spectral range, respectively, corresponding to pump and probe wavelengths for an embodiment as described herein. The NIR spectra in FIG. 10A show the sample response along the vertical antenna axis for normal incidence. The separate data points correspond to reflection of 100-fs pump pulse at 1040 nm (vertical dashed line) for 45 degree angle of incidence with respect to unpatterned substrate. FIG. 10B show MIR reflection spectra at normal incidence, indicating the antenna resonance along the horizontal axis, for a few selected devices. All measurements were collected after graphene transfer to the sample. The Quantum Cascade (QC) MIR laser spectral coverage is indicated by vertical black dashed lines.

FIGS. 11A-11F illustrate fabrication steps and characterization of an all-optical modulator device, according to an embodiment as described herein. An all-optical modulator device 1100 was fabricated onto a silicon substrate 1102 according to previously described structural designs. First, 250 nm aluminum 1104 is deposited on silicon wafer using electron beam evaporation to operate as a back reflector. Then 350 nm of aluminum oxide 1106 is deposited with atomic layer deposition (ALD) to form the spacer layer. Next, plasmonic metasurfaces composed of closely coupled nanoantenna arrays 1108 are patterned by electron beam lithography (EBL), metal evaporation (Cr~8 nm/Au~40 nm) and lift-off. Finally, monolayer graphene 1110 was transferred on top of the plasmonic metasurfaces using a wet transfer process. More detailed explanation of the device 1100 will be described further later.

Figure 11A:
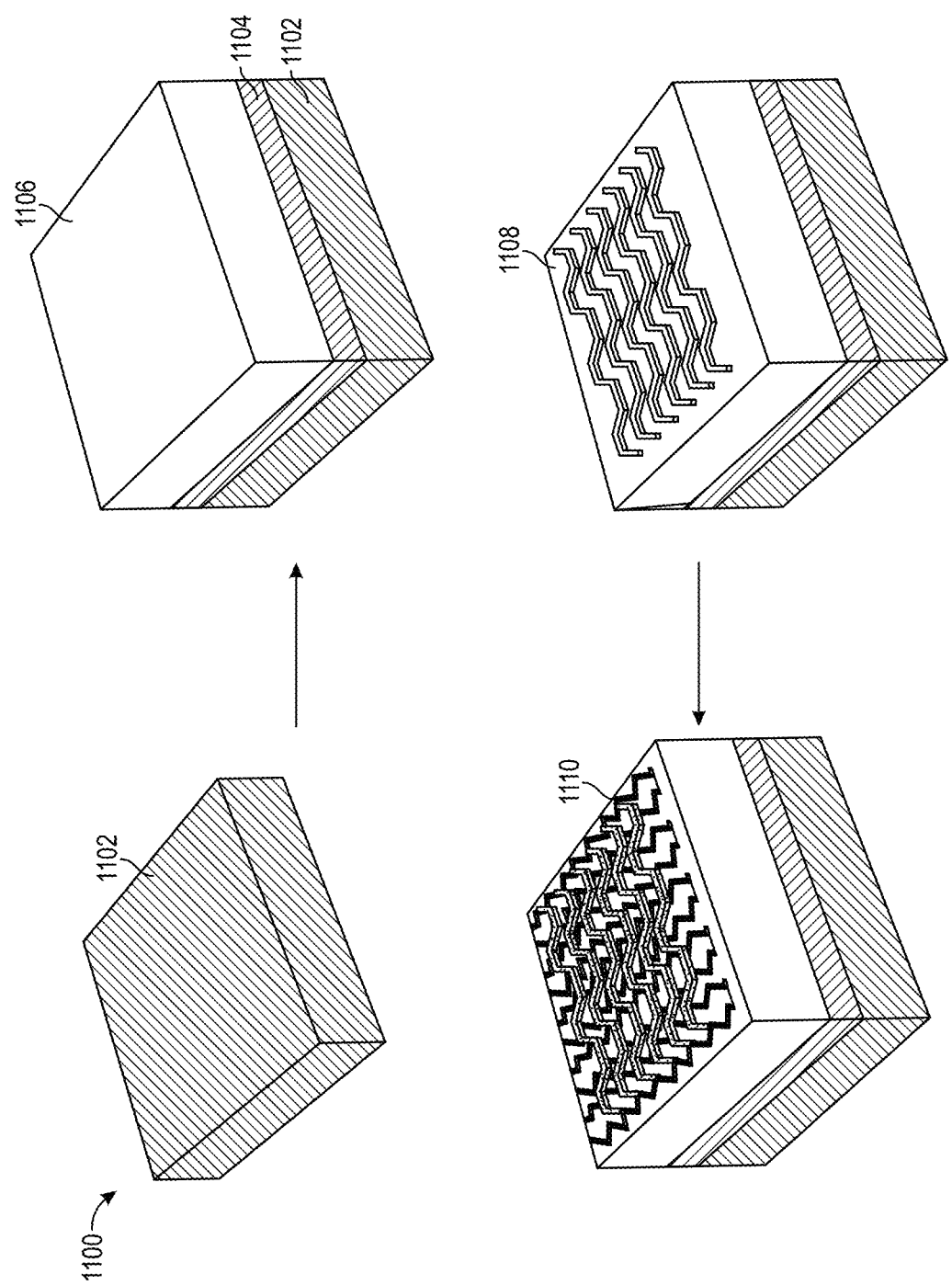
FIGS. 11A-11F illustrate fabrication steps and characterization of an all-optical modulator device, according to an embodiment.
Figure 11B:
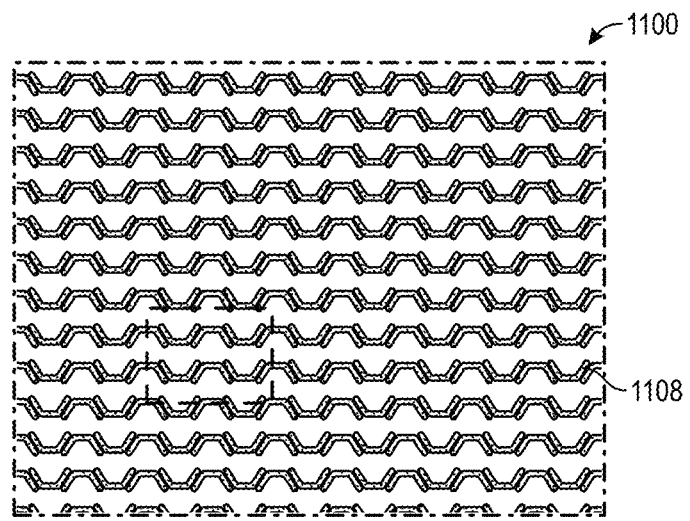
Figure 11C:
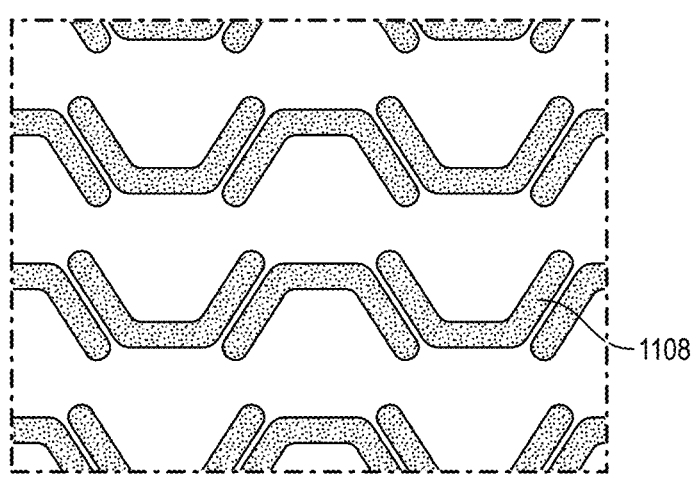
Figure 11D:
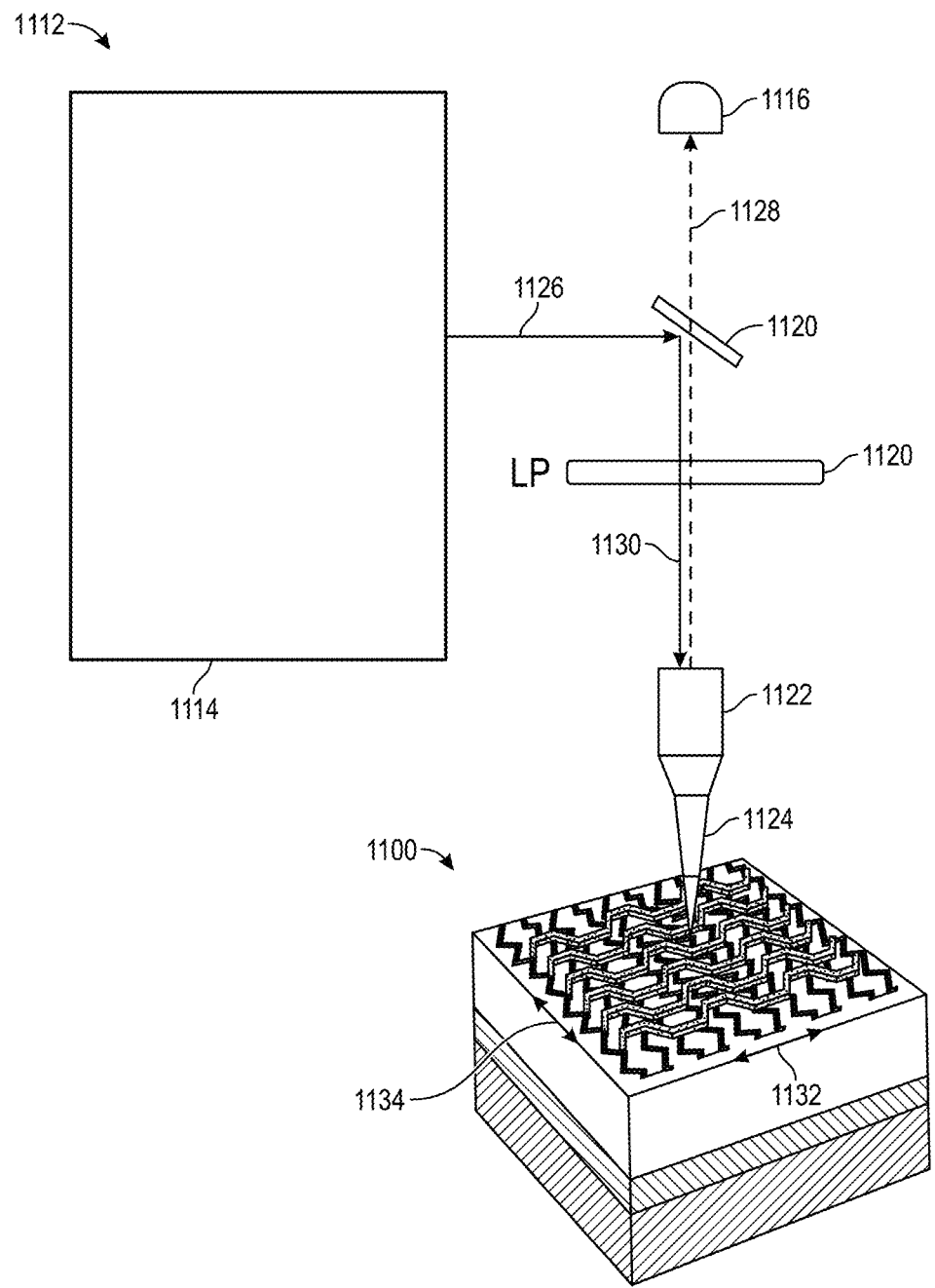

FIGS. 11B and 11C represent top-view images of the device 1100 showing fabricated Pi-shaped metasurface structure having nanoantenna arrays 1108 prior to graphene transfer. The scalebars in FIGS. 11C and 11C represent 2 μm and 1 μm, respectively. The nanogaps between the adjacent antennas were measured to be about 28.6 nm with a standard deviation of about 3.9 nm. FIG. 11D illustrates a schematic of an FTIR characterization setup 1112 to find device reflection, and hence absorption, spectra. Measurement of the reflection spectra of the fabricated devices was conducted using an FTIR spectrometer 1114 coupled to a mid-IR microscope. The sample device 1100 is illuminated by the infrared broadband internal source of FTIR at normal incidence. The incident light beam 1126 is set to S-polarization 1134 or P-polarization 1132 using a rotating linear polarizer (LP) 1120 placed on the incident beam path 1126, 1130. The incident light beam 1126 is further directed by a mirror 1118. The reflected beam 1124, 1128 off the sample device 1100 is collected by an objective lens 1122 and directed to an MCT infrared photodetector 1116.

Figure 11E:
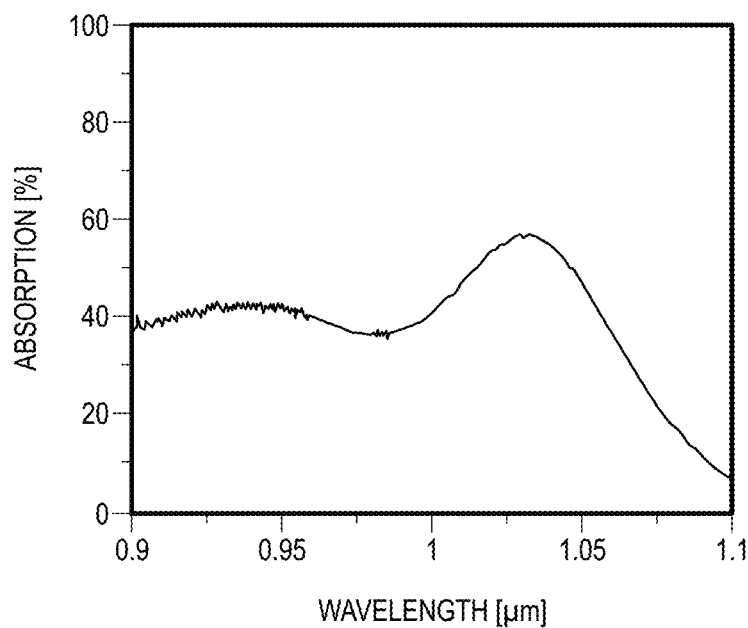

FIG. 11E is a plot showing FTIR absorption spectra for S-polarization to illustrate the enhanced pump interaction with graphene. FIG. 11E shows the absorption peak around 1.04 μm, in close vicinity of the femtosecond pump laser. As the near-field simulation results and absorption spectra in FIGS. 7C and 7D suggest, a significant fraction of this absorption is due to the electric field confinement in the antenna nanogaps overlapping with the graphene layer as the dissipative medium. Therefore, the absorption on the graphene layer is enhanced compared to a suspended graphene layer with only 2.3% absorption or a graphene layer on top of aluminum oxide spacer layer without nanoantenna pattern. This feature enables the all-optical device to operate at ultra-low incident pump fluences.

Figure 11F:
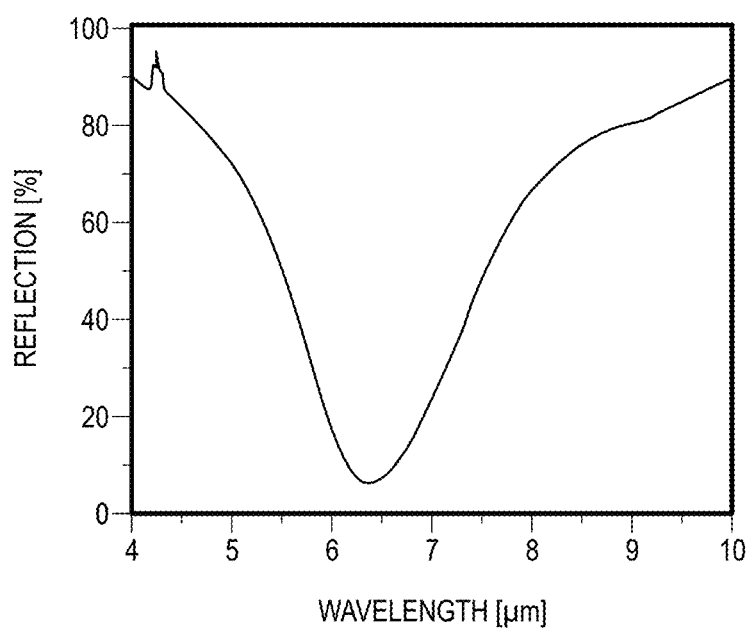

FIG. 11F is a plot showing FTIR reflection spectra for P-polarization to demonstrate the mid-infrared probe beam interaction with the metasurface absorber. FIG. 11F shows the reflection spectra in the mid-infrared regime, with absorption resonances around 6.4 μm, corresponding to the probe laser wavelength in our setup. As a result of such enhanced probe interaction with graphene, larger modulation contrast for the incident probe beams are expected, as compared to pure graphene samples.

Figure 12A:
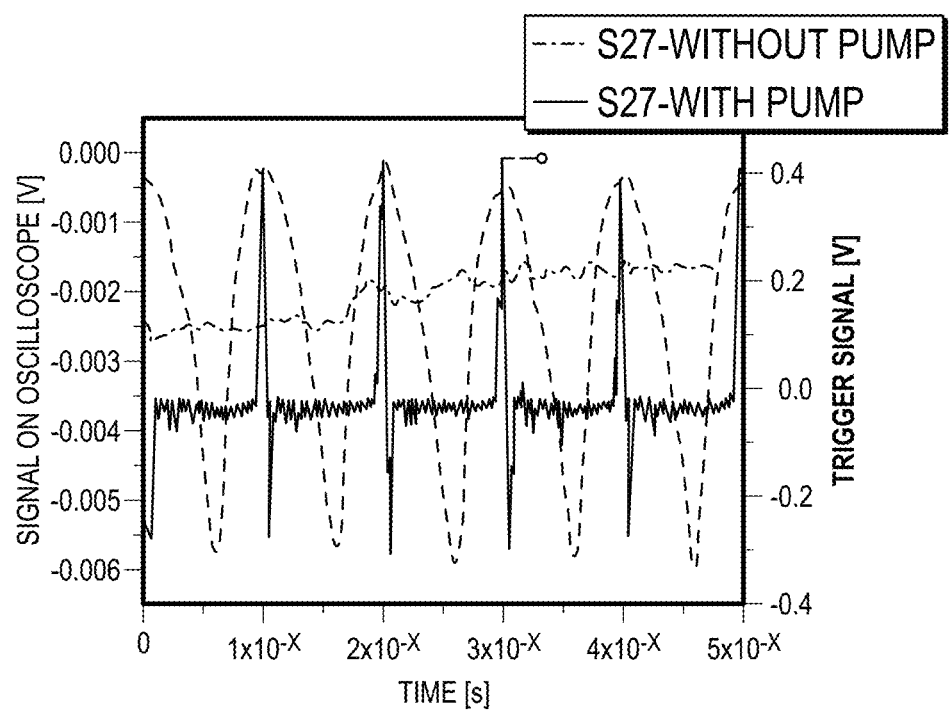
FIGS. 12A-12B show additional data from an all-optical modulation using a pump-probe spectroscopy setup, according to an embodiment.
Figure 12B:
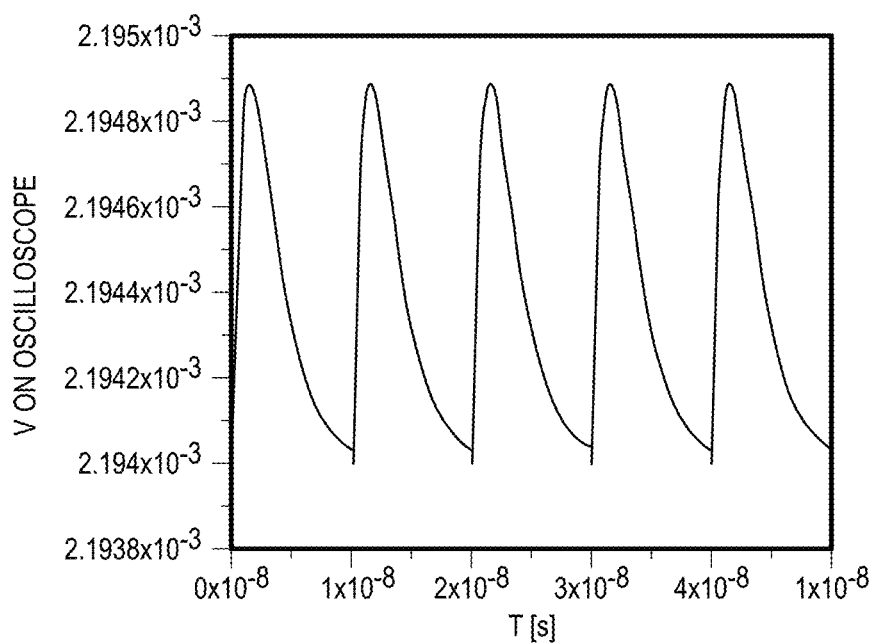

FIGS. 12A-12B show additional data from an all-optical modulation using a pump-probe spectroscopy setup, according to an embodiment described herein. Comparison of measured and simulated MIR modulation response in FIGS. 12A and 12B, respectively, on an oscilloscope, showing <10 ns full width at half maximum (FWHM). The measured data in FIG. 12A shows a clear modulation with 0.0053 V peak-to-peak modulation amplitude when the pump is on (S27-with pump), while no distinct modulation is observed when the pump is off (S27-without pump).

Figure 13A:
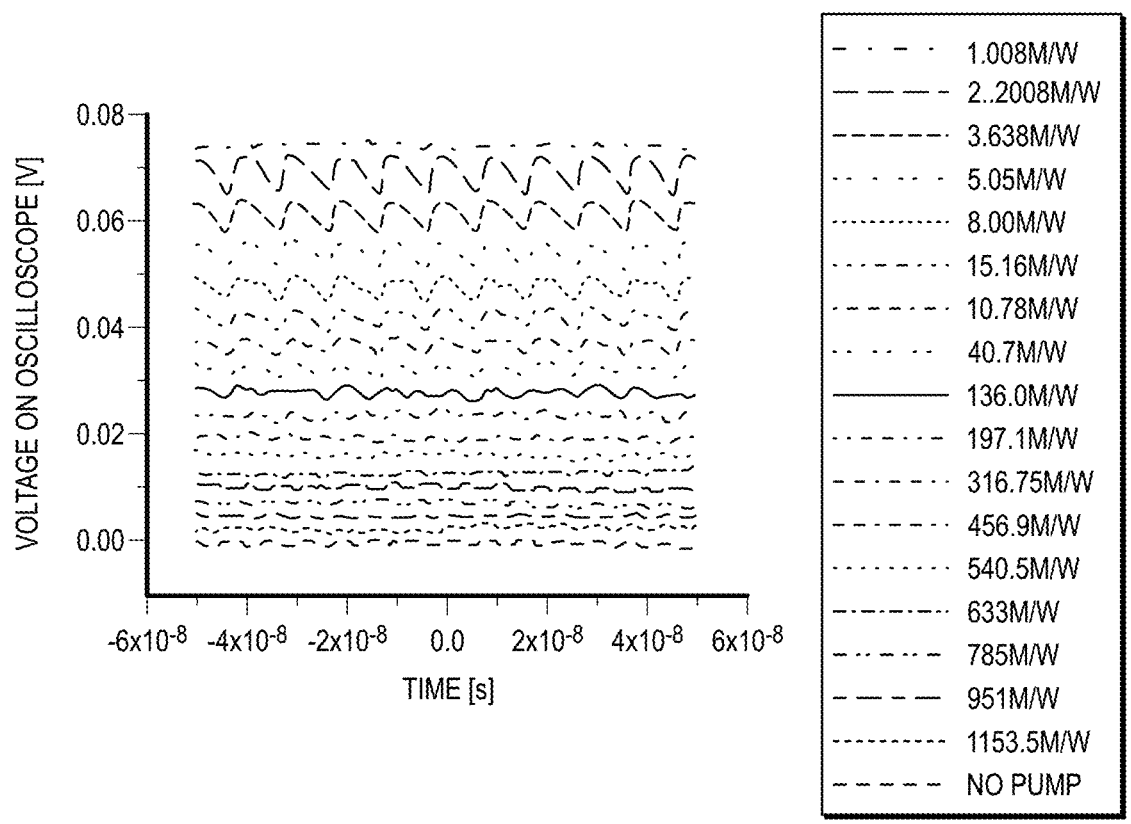
FIGS. 13A-13C show power-dependent modulation of metasurface structures, according to an embodiment.
Figure 13B:
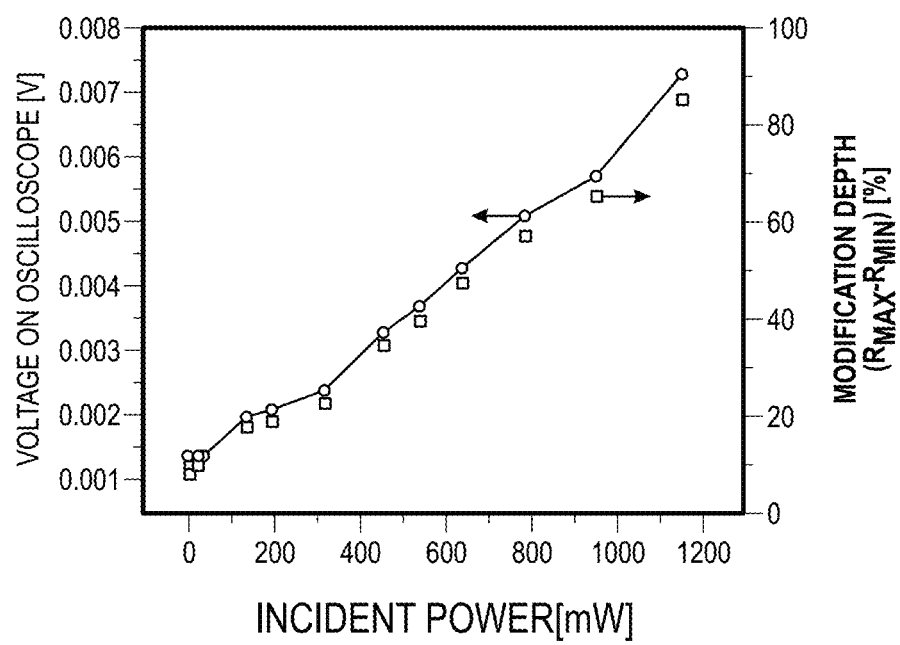
Figure 13C:
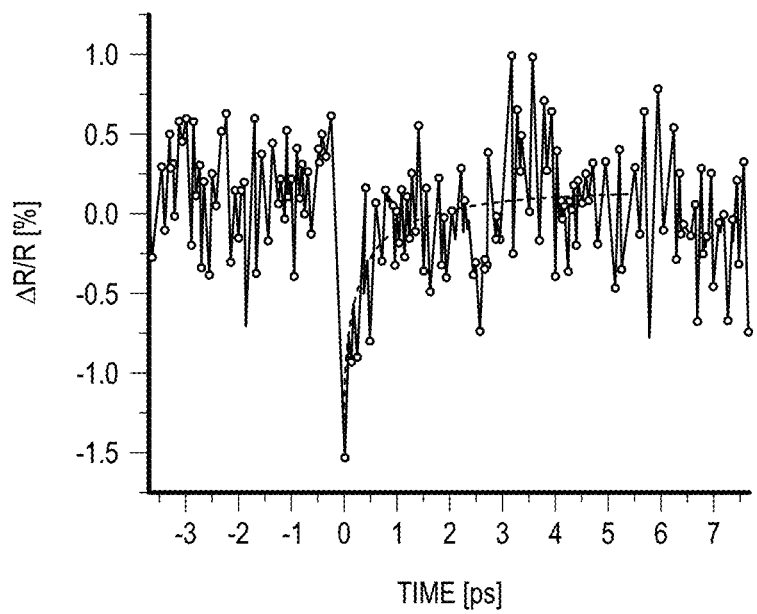

FIGS. 13A-13C show power-dependent modulation of metasurface structures, according to an embodiment described herein. FIG. 13A shows measured reflected power using a MIR photodetector for various incident powers at 1040 nm. FIG. 13B shows extracted peak-to-peak voltage (left y-axis) and evaluated modulation depth (right y-axis) for the incident power levels in FIG. 13A. The modulation depth is extracted based on the photo-carrier decay times, i.e., 200 fs and 1.56 ps, obtained by pump-probe measurement of the device with pump pulse at 1.03 μm and probe pulse at 1.56 μm as shown in FIG. 13C.

Figure 14A:
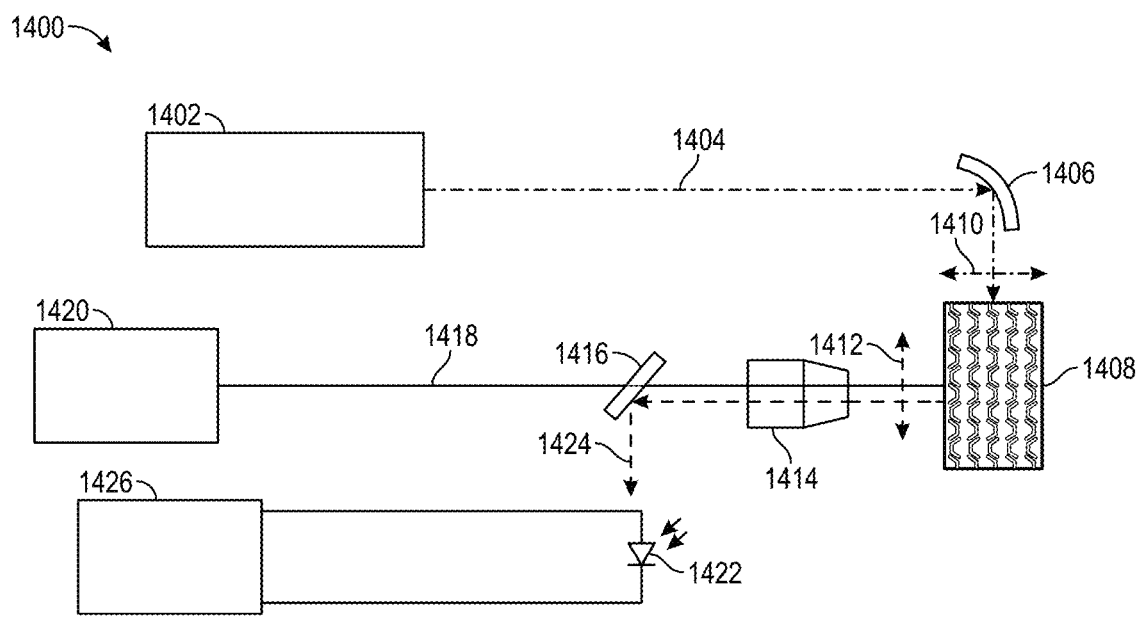
FIGS. 14A-14F illustrate a schematic and associated data utilizing an all-optical modulation and measurement setup in the mid-IR wavelength range, according to an embodiment.
Figure 14B:
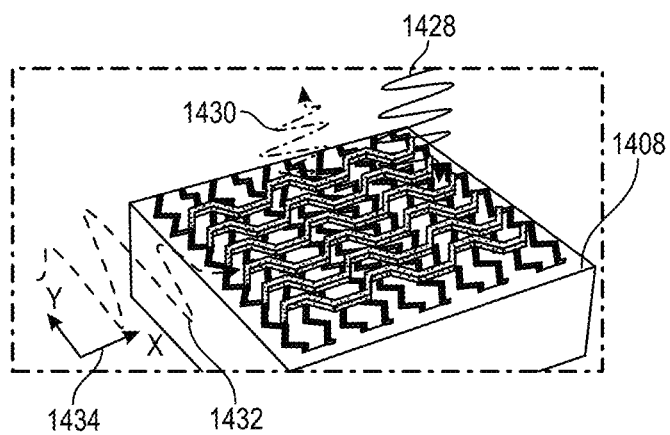

FIG. 14A is a schematic of an all-optical modulation and measurement setup in the mid-IR wavelength range. A mid-IR optical modulation static pump-probe measurement setup 1400 includes a femtosecond ytterbium laser 1402 operating at 1040 nm (pulse width ~100 fs, repetition rate 100 MHz) as pump and a single mode tunable continuous wave (CW) quantum cascade (QC) laser 1420 at 6-7 μm as probe 1418. This setup 1400 demonstrates the tunability of designs as disclosed herein to realize an all-optical modulator at ~6.4 μm wavelength range. The pump laser beam 1404 is incident at 45° with S-polarization 1410, whereas probe is incident vertically with P-polarization 1412 onto a device 1408 surface as shown in greater detail in FIG. 14B, and focused to the sample by a ZnSe objective 1414 with NA=0.13. The reflected probe beam 1424 is focused to a HgCdTe fast photodetector 1422 by a parabolic mirror 1406 and directed by a beam splitter 1416. The output photovoltage on the photodetector 1422 is measured in real time by a mixed domain oscilloscope 1426 with 1 GHz bandwidth. FIG. 14B is a schematic of the static mid-infrared optical modulation, converting the continuous wave beam into a pulsed signal. A pump beam 1432 is shown incident upon the device 1408, with the incident probe 1428 and modulated probe 1430 shown in reference to an x-y axis 1434 relative to the device 1408.

Figure 14C:
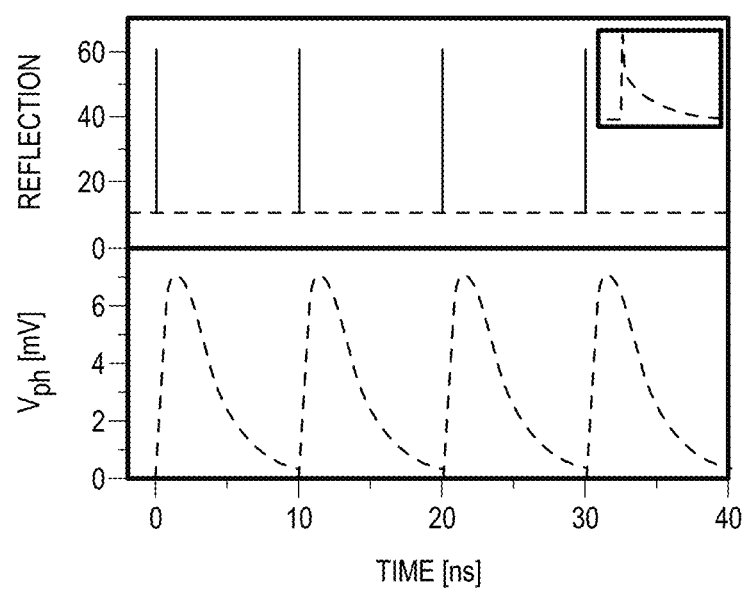

FIG. 14C is a plot of a simulation of ideal (free space) modulated pulse train in mid-IR in a top panel of the plot, and the photo-response of the photodetector, as expected to be displayed on the oscilloscope in a bottom panel of the plot. The pulse width is broadened due to the finite response time of the photodetector and oscilloscope. According to FDTD simulation results and two-temperature model as described in regard to FIGS. 7A-7K, the ideal modulated mid-IR laser beam is expected to be a pulse train with the same repetition rate as the pump laser (100 MHz) and pulse width as short as 540 fs, which is determined by the ultrafast photocarrier lifetime in graphene, as shown in FIG. 14C, top panel. However, due to the finite response times of the photodetector and oscilloscope, the time-domain pulses on the oscilloscope are expected to be significantly broadened as evidenced in FIG. 14C, bottom panel. Referring to the instrumental setup in FIG. 14A, the limited bandwidth effects of photodetector and oscilloscope with two RC-integrator circuits in series were modeled, resulting in a few nanoseconds response time.

Figure 14D:
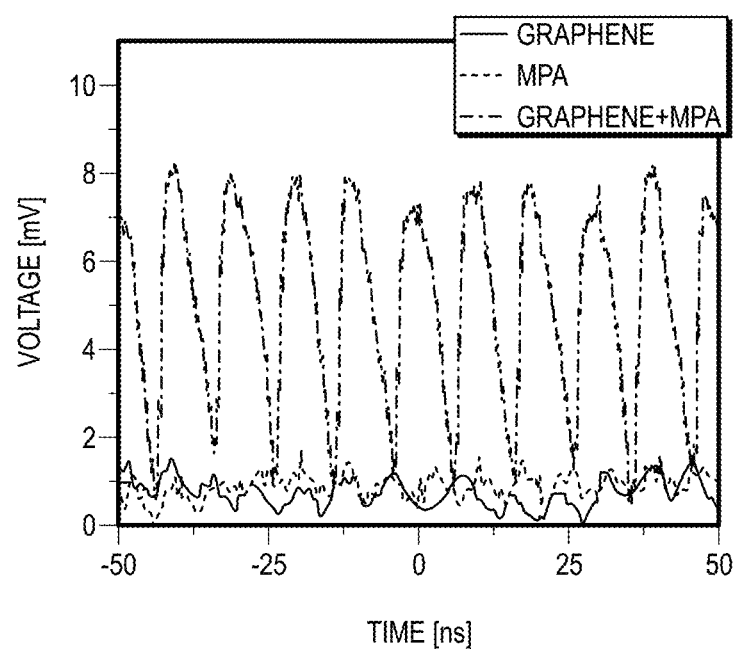

FIG. 14D is a plot of a time-domain representation of voltage modulation amplitude on a device having a bare graphene region, a bare metasurface perfect absorber (MPA) region and on an MPA covered by graphene monolayer. These results indicate that the modulations are due to the combined effect of graphene and nanoantenna. To compare this theoretical prediction with our fabricated device, the waveform on oscilloscope has been plotted for the maximum pump fluence of ~75 μJ/cm$^2$. One can confirm that the described device performance relies simultaneously on the ultrafast carrier dynamics in graphene and the enhanced pump and probe interaction with graphene via the nanoantenna structure. As a comparison, the measurement of two reference devices were also performed, one with graphene but no antenna metasurfaces and the other one with antenna metasurfaces but no graphene. There was no noticeable modulation at the same pumping level for either case, as shown in FIG. 14D. These results confirmed that the pronounced mid-IR modulation of the device was indeed due to the nanoantenna-assisted nearfield enhancement for photocarrier generation in the graphene layer. Neither the modulation of pure graphene layer nor the thermally induced modulation on the plasmonic structure would contribute noticeably to the modulation effects observed in experiments described herein.

Figure 14E:
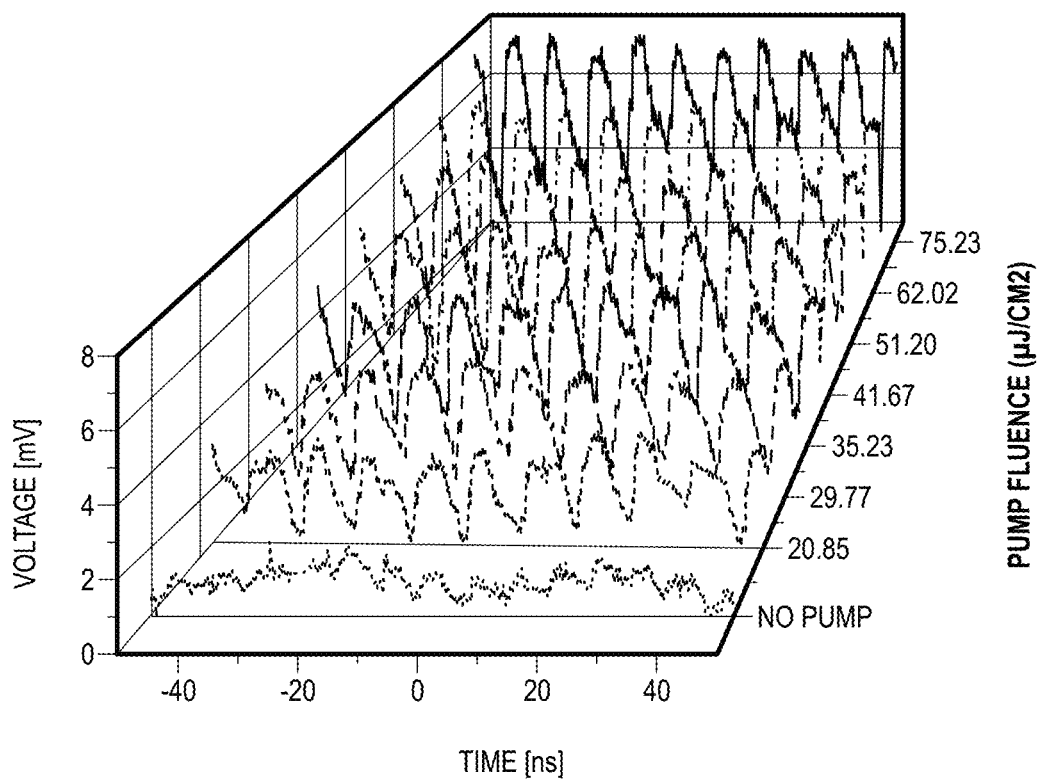

FIG. 14E is a lot showing modulation amplitude on the oscilloscope as a function of incident pump fluence to the sample. The dependence of the modulation depth on the pumping level was investigated. The measured time-domain representation of the reflectivity off the modulator, as shown on the oscilloscope screen, at various pumping powers is shown in FIG. 14E, as detected by the HgCdTe mid-IR photodetector. When there is no pump illuminating on the sample, no modulation is observed. It should be noted that the weak and higher frequency oscillations in the absence of pump completely vanish when the mid-IR probe beam is off. Therefore, their presence can be attributed to the internal cavity modes of the quantum cascade laser used to generate the CW probe beam. As the pump power was gradually increased, distinct on and off modulation cycles start to show up at pump fluence ~20 µJ/cm$^2$ and continue to rise almost linearly as a function of pump fluence. At the maximum output power of the fiber laser (~1153 mW), corresponding to ~75 µJ/cm$^2$ fluence on the device, the observed pulse train on the oscilloscope shows reasonable agreement with simulations results shown in FIG. 14C.

Figure 14F:
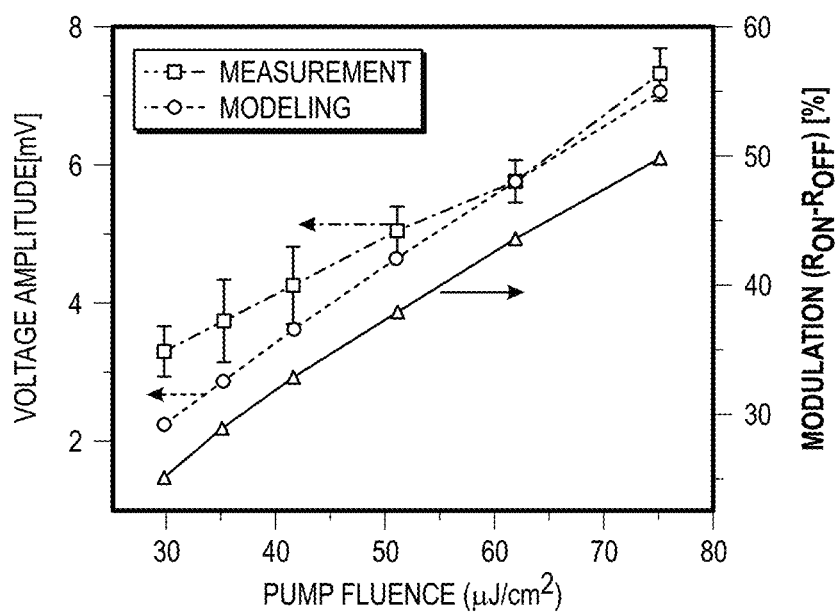

FIG. 14F is a plot illustrating extracted average peak-to-peak voltage on the oscilloscope (Measurement, squares) and the corresponding simulated amplitude (Modeling, circles) as a function of pump fluence. The right axis (triangles) indicates the modulation depth defined by the difference of estimated reflection calculated from measured amplitude voltages on oscilloscope. Based on the simulation results in FIG. 14C and their comparison with the measurement data in FIG. 14E at different pumping fluences, one can obtain the modulation depth (FIG. 14F, right axis) and estimate the waveform signal amplitude observed on the oscilloscope (FIG. 14F, Modeling on left axis). The experimentally extracted average peak-to-peak voltage on the oscilloscope screen for each pump fluence show agreement with the simulation results (FIG. 14F, Measurement on left axis). These results indicate that for 75 µJ/cm$^2$ pump fluence, in principle and based on comparison with simulations, we can observe around 50% increase in reflectivity (equivalent to ~7.5 dB modulation depth), compared to the scenario when the pump is off.

Although these measurement results described above serve as a proof-of-concept demonstration for mid-IR modulation, the experimentally confirmed response time of the all-optical modulation device in this wavelength range can be extracted by a dynamic pump-probe measurement setup using phase-locked pump (near-IR) and probe (mid-IR) lasers with few tens of femtoseconds pulse widths and suppressed relative timing jitter. These results experimentally demonstrate an all-optical modulation based on a double-enhanced structure also for mid-IR spectral ranges based on the same device concepts. The double-enhanced all-optical modulator design reduced the required pump fluence about 1 to 2 orders of magnitude smaller than previously known devices in the mid-IR range as noted later in Table 1. This paves the way for highly energy-efficient modulators covering all the mid-infrared wavelength range.

Figure 15A:
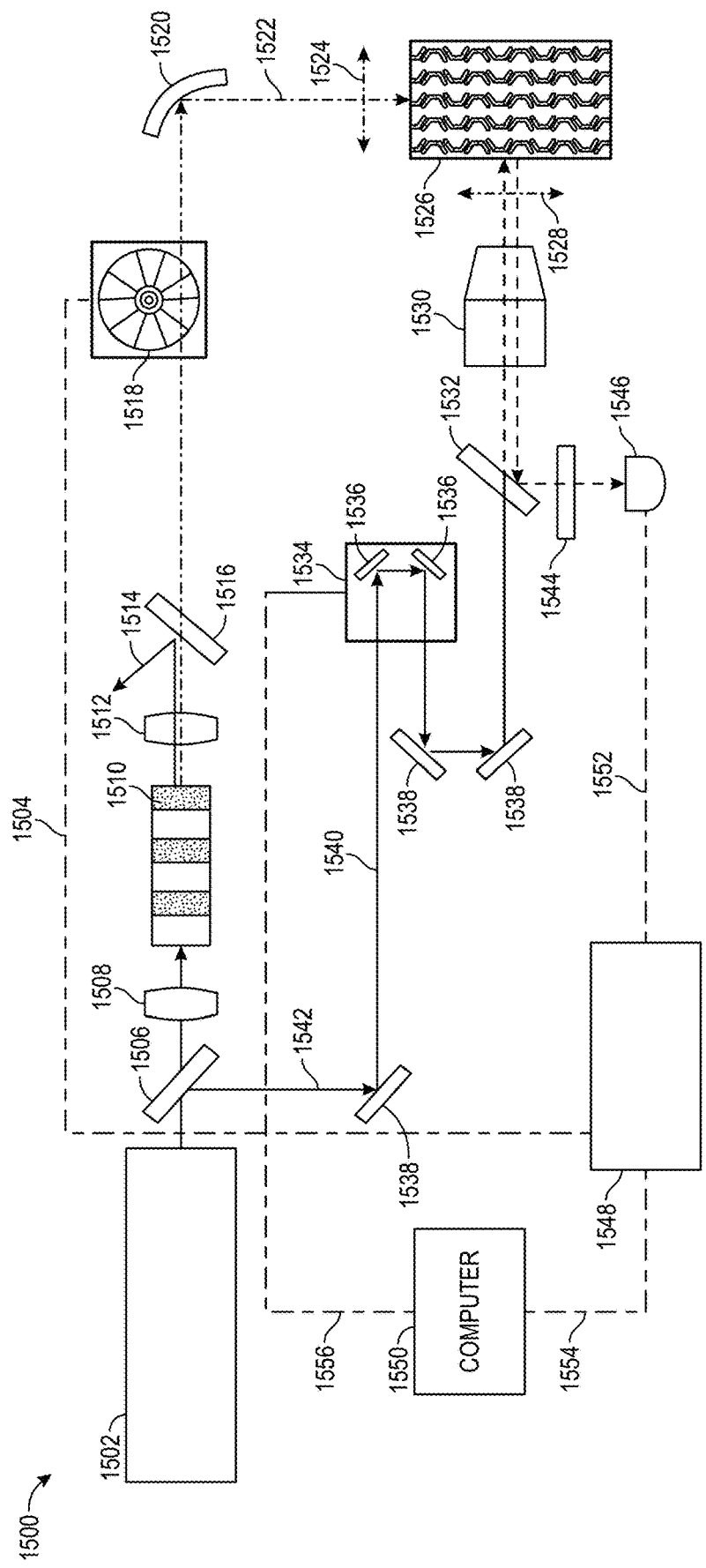
FIGS. 15A-15K illustrate a setup to measure differential reflection modulation as well as associated measurement results, according to an embodiment.
Figure 15B:
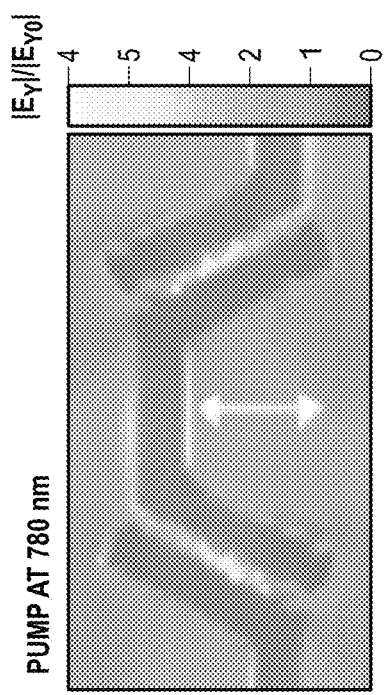
Figure 15C:
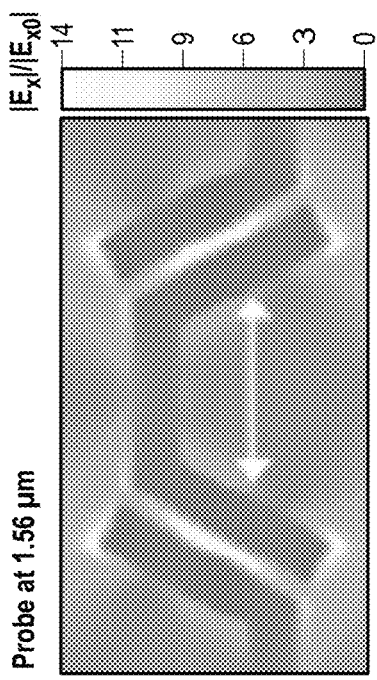
Figure 15D:
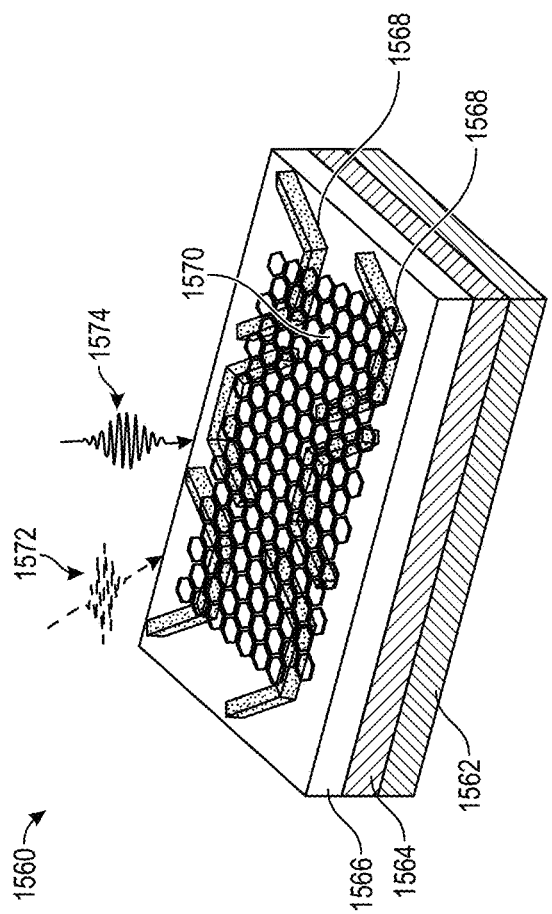

FIGS. 15A-15K illustrate a setup to measure differential reflection modulation as well as associated measurement results, according to an embodiment. FIG. 15A is a schematic of a pump-probe setup to measure differential reflection modulation. To investigate the modulation response time of the double-enhanced all-optical modulator design, ultrafast pump-probe measurement was performed. Since the operation mechanism of the double-enhanced metasurface modulator is identical for all the probe wavelengths larger than the pump wavelength, for this measurement a near-IR probe laser is considered. In the measurement setup 1500, the output from a femtosecond Erbium fiber laser 1502 (wavelength centered at 1560 nm) with 100 MHz repetition rate and ~100 fs pulse width was split into two beams 1522, 1542 at a beam splitter 1506. One laser beam 1522 was coupled into a periodically poled crystal 1510 by a first lens 1508 to generate higher harmonics and was subsequently focused by a lens 1512 and filtered at a filter 1516 to only pass the second harmonic (SH) at 780 nm, which was used as the pump light 1522, reflecting all other light 1514. The other beam 1542 was directed to the optical delay line (ODL) 1534 via one of several mirrors 1538 to adjust its optical path length relative to the pump and used as the probe beam. This measurement setup 1500 also includes a chopper 1518 and a parabolic mirror 1520 directing S-polarized light 1524 into a device 1526. The optical delay line directs P-polarized light 1528 towards the device 1526 with the use of several mirrors 1536, a beam splitter 1532, and an objective lens 1530. A longpass filter 1544 directs towards a photodetector 1546 coupled to a lock-in amplifier 1548 and computer 1550. A schematic of an exemplary device 1560 used in this setup 1500, having a silicon wafer 1562, aluminum layer 1564, aluminum oxide layer 1566, nanoantenna array 1568, and graphene monolayer 1570 is shown in FIG. 15D with pump beam $E_{y0}$ 1572 and probe beam $E_{x0}$ 1574 indicators shown as well.

As compared to the designed pump wavelength at 1040 nm in FIG. 7C, the above pump wavelength at 780 nm has slightly lower average near field enhancement inside the nanogap region of FIG. 15B. Yet, according to the measurement results, it provides much higher time resolution and reproducible results to use SH signal (780 nm) of the same laser for the probe pulse (1560 nm). The pump laser beam is incident onto the sample at an oblique angle (45°, S-polarized), while the probe beam is normally incident onto the same region on the device 1526 with perpendicular polarization. The reflected probe light went through a longpass filter 1544 (cutoff wavelength: 1150 nm and OD: 4) to filter out the scattered pump light and then was collected by an InGaAs photodetector 1546 (bandwidth 5 GHz). The photodetector output 1552 is connected to a lock-in amplifier 1548 to enhance signal to noise ratio in the pump-probe measurements. FIG. 15B is a plot of the near filed amplitude enhancement at pump (780 nm), while FIG. 15C is a plot at probe (1.56 µm) wavelengths.

Figure 15E:
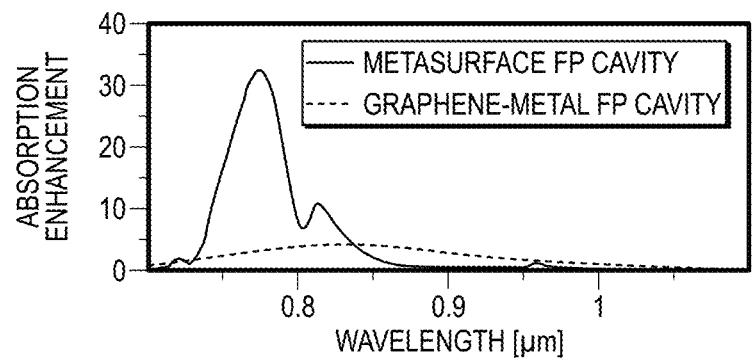
Figure 15F:
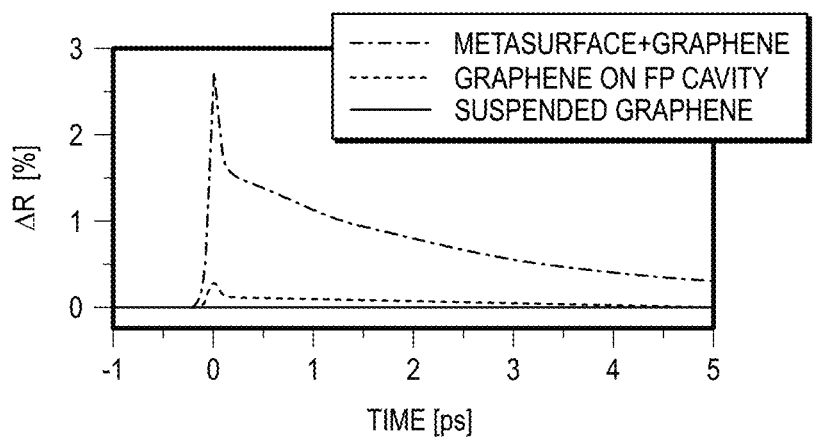

FIG. 15E is a plot of absorption enhancement spectra, with respect to bare graphene, around the pump wavelength at 780 nm with S-polarization for bare metasurface perfect absorber (MPA) region (metasurface FP cavity) and on MPA covered by graphene monolayer (graphene metal FP cavity). FIG. 15F is a plot showing corresponding reflectivity modulation based on simulations in each case as a function of time. According to the simulation results, nearly 70% of the pump is absorbed in graphene layer at the center of nanoantenna hotspot (see FIG. 15E). This indicates to about 10- and 30-times enhancement of absorption compared to the graphene-metal FP cavity and suspended graphene monolayer, respectively. Similar to the mid-IR modulation scheme, this enhanced absorption is associated with the elevation of graphene electronic temperature and change of its optical surface conductivity, resulting in the blueshift of reflection spectra around the probe laser wavelength.

The transient reflection of the device at $\lambda_0$=1.56 µm (i.e. $R(\lambda_0, Te)$–$R(\lambda_0, Te$=300 K)) is shown in FIG. 15F, indicating a full width at half maximum of less than one picoseconds. The peak modulation is nearly one order of magnitude larger than graphene without nanoantenna on the same FP substrate and about three orders of magnitude larger than a suspended graphene monolayer. The improved modulation of graphene on FP cavity compared to a suspended graphene sheet is owing to the interference effect caused by the back-reflection from underneath aluminum layer and propagating phase accumulation in spacer aluminum oxide slab (consistent with the red and green curves in the top panel of FIG. 15E). This indicates that the Fabry-Perot cavity enhances the modulation compared to the suspended graphene, while nanoantenna integration on top of the cavity provides even larger modulation by around ten times.

Figure 15G:
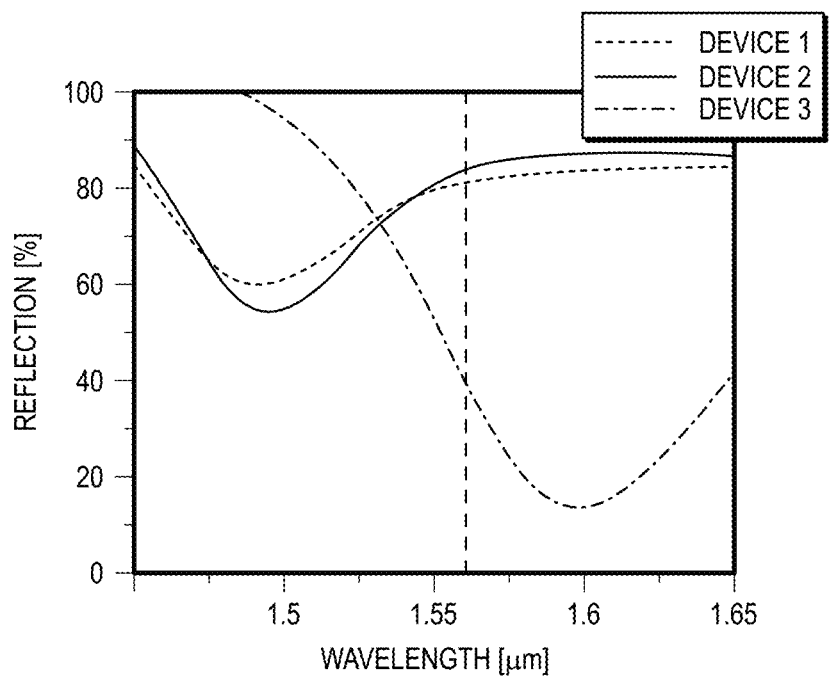
Figure 15H:
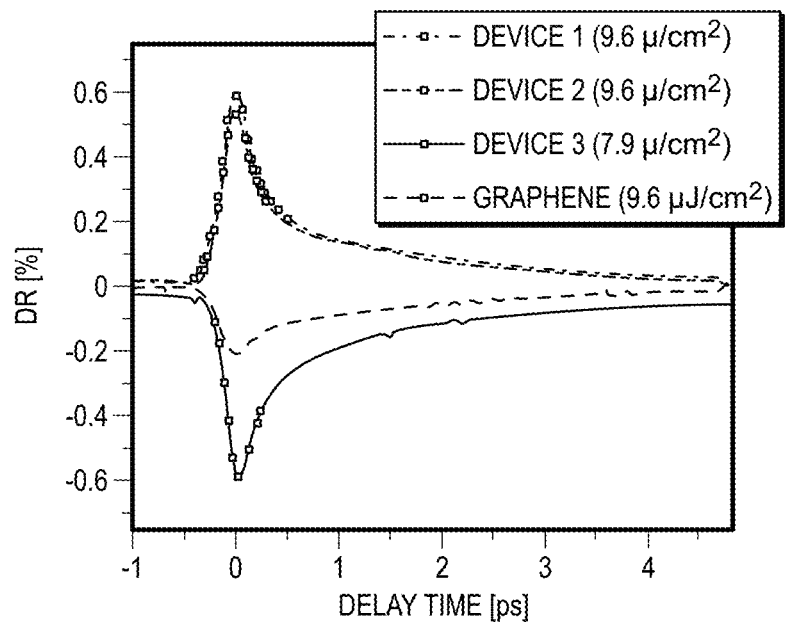

FIGS. 15G and 15H show the FTIR reflection spectra and the corresponding pump-probe measurement results of two devices with resonance wavelengths ~1.5 µm (Device 1 and Device 2) and one device at 1.6 µm (Device 3). Due to the blueshift of the absorber resonance after photocarrier generation, the sign of the relative modulation is positive (negative) for the wavelengths longer (shorter) than the probe laser wavelength, i.e. 1.56 µm. The measurement results in FIG. 15H confirms positive (devices 1 and 2) and negative (device 3) modulation signs, in agreement with the simulation results shown in FIGS. 7I and 7K for the mid-IR modulator. In FIG. 15H, the initial falling time of differential reflection due to the photogenerated hot carriers can be modeled by a Boltzmann function producing a sigmoidal curve with ~70 fs time constant. The timescale of this behavior is below the time resolution of the system (~100 fs), limited by pulsewidths of pump and probe beams. Shortly after the pump onset, the reflectivity gradually returns to equilibrium state via hot carrier thermalization and the subsequent bi-exponential emission of optical and acoustic phonons on a timescale of ~240 fs and 1.7 ps, which agree well with the simulation results shown in FIG. 15F. Compared to the previous mechanisms for all-optical graphene-based modulators shown in Table 1, exemplary devices of the present disclosure show a slightly faster recovery time (1.7 ps compared to 2.2-2.8 ps). This can be evident when this time constant is compared with the bare graphene region shown in FIG. 15H illustrating a longer recovery time of ~2.32 ps. This is most likely due to the fact that the presence of gold nanoantenna opens up new relaxation channels for the optically excited hot carriers in graphene to relax towards equilibrium state on a shorter time scale. This phenomenon could potentially be leveraged to further scale down the response time of the device. Furthermore, all devices in FIG. 15H show around ~0.6% differential reflection for a pump fluence as low as 8 µJ/cm$^2$ and probe fluence of only ~2.13 nJ/cm$^2$ delivered on the sample. This is ideal for low consumption integrated photonic devices with lower substrate heating. Compared with the simulations in FIGS. 15E and 15F, the smaller measured differential reflection may be attributed to lower absorption at pump wavelength, as well as the spectral offset and limited depth of reflection spectra in the vicinity of the probe laser wavelength. Nevertheless, the fabricated devices show nearly three times larger modulation compared with a region on the chip solely covered by graphene, indicating the improved nanoantenna-assisted modulation due to stronger nearfield interactions.

Figure 15I:
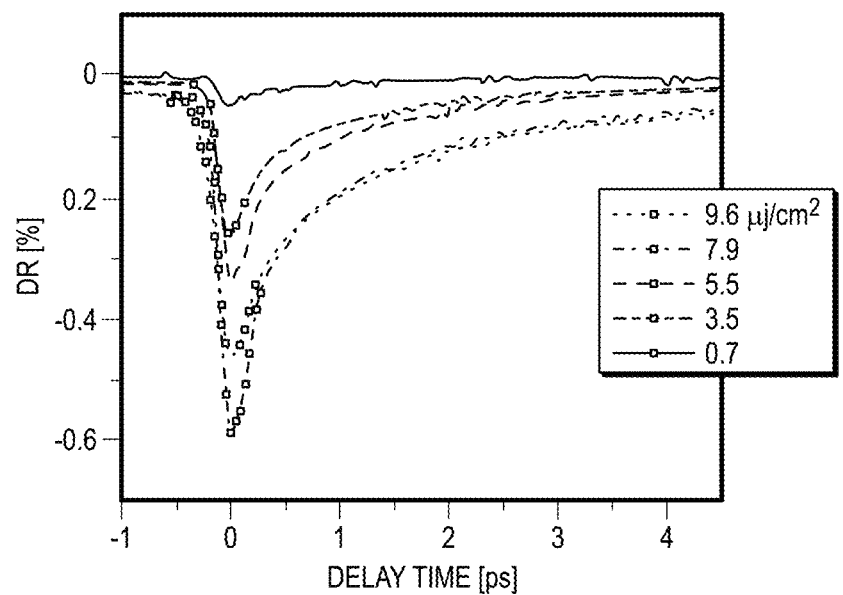

FIG. 15I is a plot of relative reflectivity modulation as a function of delay time for multiple laser pump fluences (below damage threshold) and optimum probe fluence (below reflectivity saturation limit) at ~2 nJ/cm$^2$. The time constants corresponding to bi-exponential fitting of nanoantenna device integrated with graphene, at maximum pump fluence, are 238±11 fs and 1.7±0.05 ps. As a comparison, for the bare graphene region of FIG. 15H on the spacer layer and back-reflector substrate, these values are 233±18 fs and 2.32±0.14 ps, respectively. The measured relative reflectivity modulation as a function of pump and probe delay time for Device 3 plotted in FIG. 15I, which is in agreement with simulation results. When the pump fluence was increased, more carriers were excited to the graphene conduction band. This trend will cease once the occupation of conduction band at half of the pump energy hinders hot carrier excitation due to the Pauli exclusion principle.

Figure 15J:
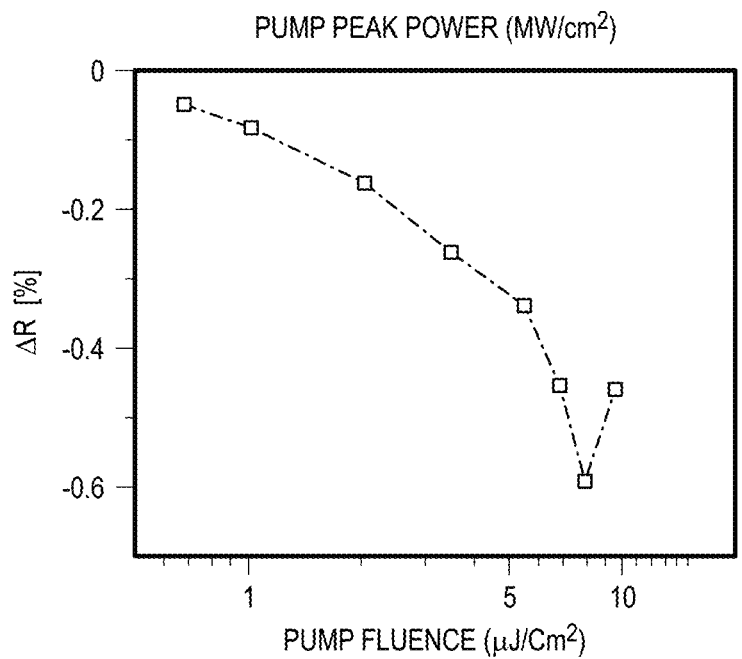

FIG. 15J is a plot of relative reflectivity modulation of the all-optical modulator for various incident pump fluences, where probe fluence on sample is kept fixed at 2 nJ/cm$^2$. The behavior illustrated in FIG. 15J suggests the optimum pump fluence of ~8 µJ/cm$^2$, where the maximum absolute reflectivity modulation for the given incident pump fluence is measured. It should be noted that this value is nearly two orders of magnitude lower than the required pump fluence in previously known graphene-based all-optical modulators shown later in Table 1, owing to the near-field enhancement due to the localized surface plasmon resonance of the fabricated metasurface structure. As the simulation results in FIGS. 15E and 15F indicate, having a device with the shorter absorption resonance located at the operation wavelength of femtosecond S-polarized pump laser and the longer absorption resonance nearly 70 nm on the left side of the P-polarized probe laser wavelength will results to an even better reflectivity modulation.

Figure 15K:
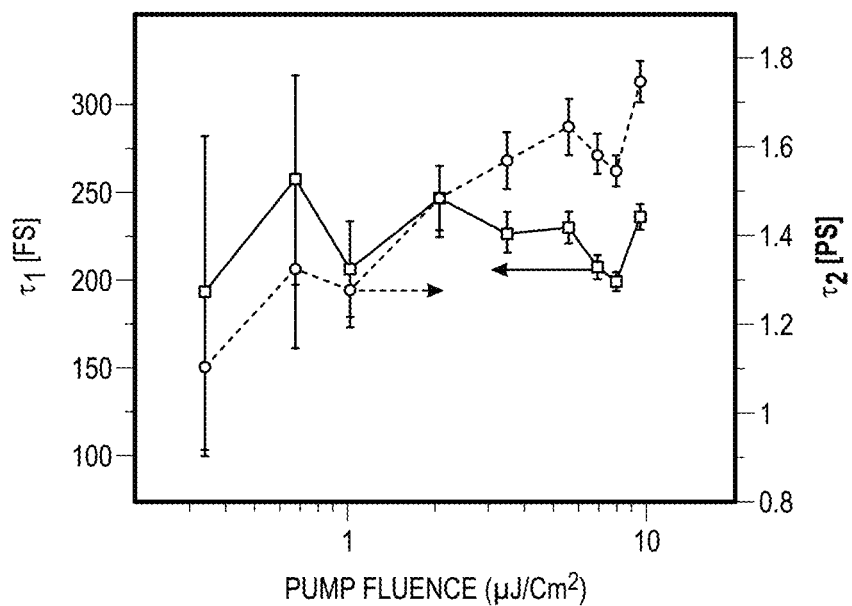

FIG. 15K shows a data extraction of faster (left-axis, squares) and slower (right-axis, circles) bi-exponential decay time constants for various pump fluences as illustrated in FIG. 15J. In order to investigate the recovery time of the all-optical modulator design as a function of pump fluence, the bi-exponential time constants were extracted. As it can be seen from the left axis of the plot, the shorter time constant does not change significantly by varying the pump fluence, while the longer one decreases from 1.75 ps to 1.1 ps when the pump fluences changes from 10 to 0.35 µJ/cm$^2$. This behavior may be attributable to the increased carrier-phonon interaction in the presence of higher concentrations of photoexcited carriers at larger pump levels. Moreover, it should be noted that as the probe fluence increases, the reflectivity of the modulator device approaches the saturation limit where the reflectivity is a sublinear function of the incident power. In other measurements of reflectivity modulation as a function of probe fluence, it has been observed that as the probe fluence surpass the threshold value of 4 nJ/cm$^2$, the change of reflectivity will be smaller compared to the increase of probe fluence. This trend suggests that the optimum probe fluence of this device would be ~4 nJ/cm$^2$. This behavior may be attributable to the saturable absorption limit of the exemplary devices of the present disclosure, where the maximum modulation per incident fluence is observed.

Exemplary devices as described herein exhibiting all-optical graphene-integrated metasurface modulators, both at 1560 nm and 6-7 µm, with ultra-low incident pump fluence, have been demonstrated. This has been realized due to the simultaneous near-field enhancement of pump and probe beams via the double-resonance nanoantenna structure. Relying on the tunability of metasurface design, embodiments of the proposed device can be used for ultrafast optical modulation from near-IR to THz regime, and provide the lowest pump fluence compared to previously known devices, exhibiting three orders of magnitude for near-IR regime, one to two orders of magnitude for any other mid-IR modulator, as well as the first-time demonstration of all-optical modulation in mid-IR regime beyond 6 µm. This enables the potential for subwavelength ultrafast optical modulation in a variety of applications, such as high speed free space communication, ultrafast molecule spectroscopy, biomedical imaging as well as material processing.

This double-enhanced modulator design concept can be adapted to realize improvements in pumping efficiency and modulation depth for optical modulators based on other materials as well. Other embodiments may be useful for next generation all optical modulators with ultra-compact footprint, ultrafast response and record-low power requirements. Moreover, this design concept can be applied to graphene optical modulators at various operational wavelengths from near infrared to far-infrared wavelengths, or even THz, which are considered challenging in conventional modulator schemes. The widely tunable optical conductivity of graphene, as well as the broad resonance tunability of the described Pi-shaped nanoantenna, enable such devices to potentially fill the technological gap of high-speed optical modulators in the mid-IR wavelength region. In fact, tuning the nanoantenna parameters such as bending angle, width and length as well as other parameters described herein, makes it possible to fabricate multiple devices on a single chip with a broad wavelength coverage, ranging from near-IR all the way extending to THz.

FIG. 16 is a schematic showing an optical modulation implementation for transmitters in high-speed high-capacity communication systems, according to an embodiment. An optical modulation setup 1600 includes a transmitter 1602 and a receiver 1604. The transmitter 1602 includes an infrared light source 1606, a modulator device 1608, a femtosecond laser 1610 and a signal encoder 1612. FIG. 17 is a schematic showing an optical modulation implementation for ultrafast infrared spectroscopy, according to an embodiment. Such an optical modulation 1700 may be useful for molecular spectroscopy, biochemistry study, material characterization, as well as other applications. The optical modulation implementation for ultrafast infrared spectroscopy 1700 shown includes an infrared light source 1702, a modulator device 1704, and a delay line 1706. A first femtosecond laser 1712 feeds into the modulator device 1704 and a second femtosecond laser 1714 feeds into a sample 1708. The first femtosecond laser 1712 and the second femtosecond laser 1714 are frequency locked with one another. Both the signal coming from the delay line 1706 and the second femtosecond laser 1714 pass through the sample 1708 and into a photodetector and/or spectrometer 1710.

EXAMPLES

Example 1—Numerical Simulations

Two temperature model for graphene: In order to simulate the carrier dynamics in graphene and the consequent change in optical properties the two-temperature model was used. In two-temperature model, excitations in the electronic system are considered and in the strongly coupled optical phonons (SCOPs), each characterized by its respective temperature, $T_{el}$ and $T_{op}$, and linked by the e-ph coupling rate:

$$\frac{dT_{el}(t)}{dt} = \frac{I(t) - \Gamma(T_{el}, T_{op})}{c_e(T_{el})}$$

$$\frac{dT_{op}(t)}{dt} = \frac{\Gamma(T_{el}, T_{op})}{c_{op}(T_{op})} - \frac{T_{op}(t) - T_0}{\tau_{op}}$$

In this description, the absorbed laser irradiance I(t) initially excites the electrons. Energy then flows into SCOPs at a rate described by:

$$\Gamma(T_{el}, T_{op}) = \beta(1+n(T_{op})\int D(E)D(E-\hbar\Omega)f(E,T_{el})(1-f(E-\hbar\Omega,T_{el}))dE - n(T_{op})\int D(E)D(E+\hbar\Omega)f(E,T_{el})(1-f(E+\hbar\Omega,T_{el}))dE)$$

This expression reflects the available phase space for electron scattering and includes only one adjustable parameter to describe the overall rate. Here $n(T_{op})$ represents SCOP population, $f(E,T_{el})$ id Fermi-Dirac distribution for electrons and $D(E) = 2E/\pi(h\nu_F)^2$ is the electron density of states in graphene. $\beta = 5$ $eV^2 cm^2 s^{-1}$ for the best match with experiments. The specific heat of the electrons ($c_e$) and the SCOPs ($c_{op}$) are obtained, respectively, from theory and experimental data using Raman spectroscopy. The slower coupling of the SCOPs to other phonons has also been included using relaxation time $\tau_{op}$ extracted from near-IR pump-probe measurements (~1.7 ps). The heating of these more numerous secondary phonons are neglected and it is assumed that they remain at the ambient temperature of $T_0 = 300$ K. The simulated behavior of maximum electronic temperature (blue) and SCOP temperature (black), have been illustrated in FIG. 7F.

The elevated electronic temperature leads to a change in graphene optical conductivity. The graphene optical conductivity can be modeled within the validity range of random phase approximation (RPA):

$$\sigma(\omega, \gamma, \mu_c, T_{el}) = \sigma_{intra}(\omega, \gamma, \mu_c, T_{el}) + \sigma_{inter}(\omega, \gamma, \mu_c, T_{el})$$

$$\sigma_{intra}(\omega, y, \mu_c, T_{el}) = \frac{-ie^2}{\pi\hbar^2(\omega+i2\gamma)} \int_0^\infty E\left(\frac{\partial f(E)}{\partial E} - \frac{\partial f(-E)}{\partial E}\right) dE$$

$$\sigma_{inter}(\omega, \gamma, \mu_c, T_{el}) = \frac{ie^2(\omega+i2\gamma)}{\pi\hbar^2} \int_0^\infty \frac{f(-E) - f(E)}{(\omega+i2\gamma)^2 - 4(E/\hbar)^2} dE$$

Here $\gamma$ is the scattering rate of carriers, $T_{el}$ is the electronic temperature and $\mu_c$ the Fermi level. The optical response of such a graphene sheet can be modeled using a 2D surface conductivity in FDTD Lumerical Solutions to find the reflectivity of device at each time step.

To model the ultrafast modulation behavior of our device, we assume the pump light is from a femtosecond laser. FIG. 7B illustrates the photocarrier-induced dynamics before and after a pump pulse incident onto the device. Before the arrival of the optical excitation pulse, the carrier distribution is described by a Fermi-Dirac function at room temperature. The optical excitation generates a non-equilibrium distribution of hot electrons in conduction band and holes in valence corresponding to an elevated electronic temperature $T_e$ which can be as high as a few thousands of Kelvin. Shortly after photocarrier generation, ultrafast Coulomb-induced carrier relaxation redistributes the excited carriers and a hot Fermi-Dirac distribution is established via carrier-carrier interaction (Auger recombination and impact ionization) on a sub-100 fs time scale. This distribution cools down toward the lattice temperature via emission of optical phonons, super-collisions (impurity-assisted collisions) and interaction with acoustic phonons. Experimental studies of time-resolved and angle-resolved photoemission spectroscopy in graphene suggest that the decay of electronic temperature can be well described by a bi-exponential curve, corresponding to optical phonon emission within few hundreds of femtoseconds and slower thermalization mechanism involving acoustic phonons of over a few picoseconds. This transient behavior of electronic temperature under optical pulse excitation and its subsequent heat transfer to phonon modes can be well described using a two-temperature model (TTM) (see top panels in FIG. 7E).

Next, the transient electronic temperature values obtained by TTM were input into FDTD simulator to find the corresponding reflection spectra. This enables the simulation of the change of reflectivity at the desired probe wavelength as a function of time. As the graphene electronic temperature elevates from equilibrium, the metasurface resonance blue-shifts due to local change of refractive index, resulting to increase in reflectivity of devices above the original localized surface plasmon resonance of metasurface. Consequently, as the graphene electronic temperature relaxes towards equilibrium, the relative reflectivity modulation returns to zero on picoseconds time scale as well (FIG. 7K).

Numerical Simulations: The FDTD simulations were performed using Lumerical Solutions FDTD. The material optical properties of gold, aluminum, aluminum oxide and graphene are selected from the simulation package database. The thickness of each layer is determined by deposition rate and confirmed by profilometer. The nanoantenna dimensions are determined from SEM images. The plane wave source in simulation is at normal incidence. The in-plane boundary conditions were set to periodic, while using perfectly matched layer (PML) and perfect electrical conductor (PEC) for top and bottom out-of-plane boundaries, respectively. Refined mesh grids in the graphene and nanoantenna interface were used with a minimum mesh size of 2.5 nm. The auto-shutoff for convergence of simulations was set to 10-5.

Example 2—Fabrication

Back-reflector and spacer layer deposition: The 250 nm aluminum back-reflector was deposited using electron beam evaporation (PVD 75, Kurt J. Lesker Company®). Next, 350 nm aluminum oxide was deposited through atomic layer deposition (Cambridge Savannah ALD) to form the spacer layer between top metasurface structure and the bottom metallic back-reflector.

Nanoantenna fabrication: The aluminum oxide substrate was spin-coated with double-layer poly(methyl methacrylate) (PMMA) (120 nm 495 k followed with 50 nm 950 k) and a very thin (~10 nm) thermally evaporated Cr layer for charge dissipation. Next, the samples were exposed by e-beam lithography (EBL, JEOL JBX-6000FS), and developed in a mixture of methyl isobutyl ketone (MIBK) and isopropanol (IPA) with a mixing ratio 1:3. The sample was cleaned by oxygen plasma (Plasma-Therm 790, 5 sccm $O_2$ with 8 mTorr chamber pressure, 20 W) for 30 seconds to remove the residual PMMA on the exposed region. Next, 40 nm gold was deposited by thermal evaporation (Edwards Auto 306). Next, the gold nanoantenna was lifted off by soaking the sample in acetone for 1 hour followed by sonication for 30 seconds.

Graphene transfer: A drop of DI water was placed on glass slides. The graphene sample, a thin copper foil covered by graphene on both sides, was placed on it. Then, the samples were spin coated 495K PMMA with 3000 RPM for 30 s. Next, the samples were flipped over and placed on a glass slide with the backside without the PMMA protective layer facing up. Then the edges of the sample were covered to fix its position and the back-side graphene was completely etched with $O_2$ plasma for 15 minutes. In the next step, the four edges of the sample were cut to remove the boundary graphene residues on copper and the sample was floated on copper etchant ($CuCl_2$/HCl) with the PMMA side facing up. The sample was transferred with a $SiO_2$ wafer to DI water and rinsed three times to clean the copper etchant residue. Finally, the sample was picked up with the substrate from DI water, dried with nitrogen, rinsed with acetone and IPA and then dried the sample once again with nitrogen.

Example 3—Measurements

FTIR reflection spectra measurements: The optical reflection measurements at normal incidence were performed using a Bruker Vertex 70 FTIR spectrometer connected to a Hyperion 2000 mid-IR microscope as shown in FIG. 11D. For the measurements with S- and P-polarization a linear polarizer was placed in the optical path right before the sample under test to ensure linear polarization incidence. The reflected light was collected by 15× objective lens with a numerical aperture (N.A.) of 0.4 and measured by photo-voltaic mercury cadmium telluride (MCT detector). All the reflection spectra are normalized with respect to that of the bare aluminum oxide substrate to eliminate impact of the substrate.

VIS-NIR pump-probe: The demonstration of near-IR modulation was implemented via a pump-probe spectroscopy setup as discussed in FIG. 14A. The probe pulse was generated by the fundamental frequency of a femtosecond Erbium fiber laser with 100 MHz repetition rate and ~100 fs pulse width at 1560 nm with FWHM-10 nm, while the pump was delivered through the second harmonic generation (SHG) process at 780 nm with a maximum fluence of ~10 $\mu J/cm^2$. The pump beam was incident at 45° to the sample, while the probe beam was incident at normal angle. The reflected probe light was collected after beam size shrinking by a combination of two plano-convex lenses and then focused onto a 5 GHz InGaAs photodetector (responsivity ~1 A/W at 1560 nm, noise equivalent power (NEP) <$2\times10^{15}$ W/$\sqrt{Hz}$) to analyze the reflectivity change. Additionally, a longpass filter with cutoff at 1150 nm and OD-4 was used to filter out the partially scattered pump light, which otherwise would be collected by the photodetector and interfere with the probe pulse. Next, a phase sensitive detection approach was applied by placing a chopper on the pump path (optimized chopping frequency ~1190 Hz) and set it as the reference signal for the lock-in amplifier. The photodetector output fed the input channel of the lock-in amplifier and the DC output was recorded by computer, before the optical delay line (ODL) moved to the next step. The instrument control toolbox in MATLAB was used to automate and synchronize the ODL movements and recording of the sourcemeter readings.

MIR-NIR pump-probe: To investigate the device performance in mid-IR, we used a femtosecond Ytterbium fiber laser (Menlo Systems) at 1040 nm with 100 MHz repetition rate and ~100 fs pulsewidth as pump and a CW quantum cascade laser (Daylight Solutions) operating between 6 to 7 $\mu m$ as probe laser as discussed in FIG. 15A. The pump was incident at 45° with S-polarization, whereas probe was P-polarized at normal and focused to the sample by a ZnSe objective with NA=0.13. The reflected probe beam was focused to a HgCdTe fast photodetector (bandwidth of 445 MHz) (PVI-2TE-10.6, VIGO System S.A.) by a parabolic mirror (reflected focal length of 2 inches) and displayed by a mixed domain oscilloscope (MDO3104, Tektronix) with 1 GHz bandwidth.

Table 1 shows a number of previously known all-optical modulator devices associated with their specifications in the mid-IR range.

TABLE 1

| | Pump fluence (mJ/cm$^2$) | Pump wavelength (nm) | Modulation wavelength | Response time |
|---|---|---|---|---|
| Graphene-clad microfiber | 1.2 | 789 | 1550 nm | 2.2 ps |
| Stereo graphene-microfiber | 212 | 1064 | 1550 nm | N/A |
| Dielectric-loaded waveguide with graphene-silicon heterojunction | N/A | 532 | 1550 nm | N/A |
| Graphene-based thin film absorber | 0.69 | 800 | 2.17 THz | 2.79 ps |
| Colloidal plasmonic semiconductor nanocrystals | ~28 | 800-1550 | 1-2.8 μm | >315 fs |
| Chains of Silicon Nanoantennas | ~0.032 | 710 | 1550 nm | >50 ps |

Devices described herein are suitable for ultrafast modulation of coherent (e.g., lasers), as well as incoherent (e.g., thermal emitters) sources, and has a high damage threshold (>100 μJ/cm$^2$). These all-optical devices eliminate the complexity of adding external circuitry and gate bias for modulation of carrier density in graphene. In addition, the modulation speed s enhanced by 3 to 4 orders of magnitude compared with electrical modulation, since the relaxation speed depends on carrier dynamics in graphene (few hundreds of femtosecond) and not the RC constant of external waveform generator.

Devices described herein are fabricated by standard EBL fabrication and graphene transfer, which is compactable with various substrates including silicon. These devices are CMOS compatible and can be integrated on chip. The lateral dimensions for each device is less than 200 μm×200 μm and the thickness is around 600 nm, hence deep sub-wavelength (~λ$_0$/10). The device could also be fabricated with other nanofabrication techniques, such as nanoimprint lithography, EUV lithography, etc.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. An optical device comprising:
    a silicon substrate;
    a dielectric layer;
    an aluminum layer between the silicon substrate and the dielectric layer; and
    a metasurface nanostructure comprising:
        a graphene monolayer on the dielectric layer; and
        an electrically conductive nanoantenna array in direct contact with the graphene monolayer, wherein each nanoantenna in the nanoantenna array comprises multiple segments, each segment having one or more parameters selected to achieve simultaneous resonance in the mid-infrared and the near infrared spectral regions when the graphene monolayer is irradiated with a near infrared pump pulse and a continuous mid-infrared probe, wherein
    the optical device generates mid-infrared pulses via ultrafast modulation of hot carriers in the graphene monolayer, and
    the device achieves near field intensity enhancement of the near infrared pump pulse and the continuous mid-infrared probe exceeding 100 and 1500 fold, respectively.

2. The optical device of claim 1, wherein the one or more parameters comprise:
    a length;
    a width;
    an angular orientation with respect to one or more adjacent segments; and
    a gap between one or more adjacent segments.

3. The optical device of claim 1, wherein the continuous mid-infrared probe is a coherent source or an incoherent source.

4. The optical device of claim 3, wherein the coherent source is a laser.

5. The optical device of claim 3, wherein the incoherent source is a thermal emitter.

6. The optical device of claim 1, wherein the mid-infrared pulses have a modulation time between about 100 femtoseconds and about 500 femtoseconds.

7. The optical device of claim 6, wherein the mid-infrared pulses have a modulation depth exceeding 10 dB.

8. The optical device of claim 1, wherein a maximum dimension of each segment is 1000 nm or less.

9. The optical device of claim 1, wherein a wavelength of the resonance in the mid-infrared is tunable.

10. The optical device of claim 9, wherein the resonance in the mid-infrared is at a wavelength between about 5 μm and about 20 μm.

11. The optical device of claim 1, wherein a wavelength of the resonance in the near infrared is tunable.

12. The optical device of claim 11, wherein the resonance in the near infrared is at a wavelength of about 1 μm.

13. The optical device of claim 1, wherein the modulation is all-optical.

14. The optical device of claim 1, wherein a polarization of the near infrared pump pulse and a polarization of the continuous mid-infrared probe are orthogonal.

15. The optical device of claim 1, wherein a thickness of the dielectric layer is between about 300 nm and about 400 nm.

16. The optical device of claim 1, wherein the nanoantenna array comprises gold.

17. The optical device of claim 1, wherein the nanoantenna array comprises a multiplicity of laterally coupled nanoantennas.

18. The optical device of claim 1, wherein the optical device is configured for optical communication, ultrafast pump probe measurement, or ultrafast molecular spectroscopy.

19. A method of optical communication, comprising:
irradiating an optical device comprising an electrically conductive nanoantenna array in direct contact with a graphene monolayer with a near infrared pump pulse;
irradiating the optical device with a mid-infrared probe;
modulating hot carriers in the graphene monolayer; and generating mid-infrared pulses, and
wherein the optical device achieves near field intensity enhancement of the near infrared pump pulse and a continuous mid-infrared probe exceeding 100 and 1500 fold, respectively.

* * * * *